(12) United States Patent  
Islam et al.

(10) Patent No.: US 6,744,553 B1  
(45) Date of Patent: Jun. 1, 2004

(54) SYSTEM AND METHOD FOR CONVERTING A PLURALITY OF WAVELENGTHS

(75) Inventors: Mohammed N. Islam, Allen, TX (US); Ozdal Boyraz, Ann Arbor, MI (US); Carl A. Dewilde, Richardson, TX (US)

(73) Assignee: Xtera Communications, Inc., Allen, TX (US)

(*) Notice: Subject to any disclaimer, the term of this patent is extended or adjusted under 35 U.S.C. 154(b) by 294 days.

(21) Appl. No.: 09/885,678

(22) Filed: Jun. 20, 2001

Related U.S. Application Data

(60) Provisional application No. 60/212,889, filed on Jun. 20, 2000.

(51) Int. Cl.[7] .............................. G02F 1/35; G02F 1/39; G02F 2/02
(52) U.S. Cl. ...................................... 359/326; 359/330
(58) Field of Search ................... 359/326–332

(56) References Cited

U.S. PATENT DOCUMENTS

| | | | | |
|---|---|---|---|---|
| 3,746,879 A | * | 7/1973 | Esaki et al. .................. | 359/328 |
| 4,700,339 A | | 10/1987 | Gordon et al. ............... | 370/3 |
| 4,740,974 A | | 4/1988 | Byron ........................... | 372/3 |
| 4,923,291 A | | 5/1990 | Edagawa et al. ............. | 350/389 |
| 4,932,739 A | | 6/1990 | Islam ........................... | 350/96.15 |
| 4,995,690 A | | 2/1991 | Islam ........................... | 350/96.15 |
| 5,020,050 A | | 5/1991 | Islam ........................... | 370/4 |
| 5,078,464 A | | 1/1992 | Islam ........................... | 385/122 |
| 5,101,456 A | | 3/1992 | Islam ........................... | 385/27 |
| 5,115,488 A | | 5/1992 | Islam et al. .................. | 385/129 |
| 5,224,194 A | | 6/1993 | Islam ........................... | 385/122 |
| 5,369,519 A | | 11/1994 | Islam ........................... | 359/173 |
| 5,375,138 A | * | 12/1994 | Kozlovsky et al. ........... | 372/92 |
| 5,477,555 A | | 12/1995 | Debeau et al. ............... | 372/25 |
| 5,479,291 A | | 12/1995 | Smith et al. .................. | 359/333 |
| 5,485,536 A | | 1/1996 | Islam ........................... | 385/31 |
| 5,497,386 A | | 3/1996 | Fontana ........................ | 372/18 |
| 5,577,057 A | | 11/1996 | Frisken ......................... | 372/18 |
| 5,664,036 A | | 9/1997 | Islam ........................... | 385/31 |
| 5,734,665 A | | 3/1998 | Jeon et al. .................... | 372/6 |
| 5,757,541 A | | 5/1998 | Fidric ........................... | 359/341 |
| 5,778,014 A | | 7/1998 | Islam ........................... | 372/6 |
| 5,796,909 A | | 8/1998 | Islam ........................... | 385/147 |
| 5,940,206 A | * | 8/1999 | Kuroda et al. ............... | 359/330 |
| 5,991,316 A | * | 11/1999 | Kikuchi ........................ | 372/21 |
| 6,043,927 A | | 3/2000 | Islam ........................... | 359/332 |
| 6,049,415 A | | 4/2000 | Grubb et al. ................. | 359/341 |
| 6,052,393 A | | 4/2000 | Islam ........................... | 372/6 |
| 6,101,024 A | | 8/2000 | Islam et al. .................. | 359/334 |
| 6,118,566 A | | 9/2000 | Price ............................ | 359/181 |

(List continued on next page.)

FOREIGN PATENT DOCUMENTS

WO   00/27054   5/2000   .......... H04B/10/04

OTHER PUBLICATIONS

Stolen et al., "Parametric Amplification and Frequency Conversion in Optical Fibers," IEEE Journal of Quantum Electronics, vol. QE–18, No. 7, pp. 1062–1072, Jul. 1982.

(List continued on next page.)

*Primary Examiner*—John D. Lee  
(74) *Attorney, Agent, or Firm*—Baker Botts L.L.P.

(57) ABSTRACT

In one aspect of the invention, an apparatus operable to convert wavelengths of a plurality of optical signals includes a coupler operable to receive a pump signal and a plurality of input signals each input signal comprising at least one wavelength different than the wavelengths of others of the plurality of input optical signals. The apparatus further includes an optical medium operable to receive the pump signal and the plurality of input signals from the couplet, wherein the pump signal and each of the plurality of input signals are synchronized to overlap at least partially during at least a part of the time spent traversing the optical medium to facilitate generation of a plurality of converted wavelength signals each comprising a wavelength that is different than the wavelengths of at least some of the plurality of input signals. Various embodiments can result in low cross-talk and/or low polarization sensitivity.

135 Claims, 6 Drawing Sheets

U.S. PATENT DOCUMENTS

| | | | |
|---|---|---|---|
| 6,154,310 A * | 11/2000 | Galvanauskas et al. | 359/328 |
| 6,229,937 B1 | 5/2001 | Nolan et al. | 385/24 |
| 6,239,902 B1 | 5/2001 | Islam et al. | 359/334 |
| 6,239,903 B1 | 5/2001 | Islam et al. | 359/337 |
| 6,288,832 B1 * | 9/2001 | Richman et al. | 359/330 |
| 6,335,820 B1 | 1/2002 | Islam | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |

OTHER PUBLICATIONS

Inoue et al., "Wavelength Conversion Experiment Using Fiber Four–Wave Mixing," IEEE Photonics Technology Letters, vol. 4, No. 1, pp. 69–72, Jan. 1992.

Inoue, "Four–Wave Mixing in an Optical Fiber in the Zero–Dispersion Wavelength Region," Journal of Lightwave Technology, vol. 10, No. 11, pp. 1553–1561, Nov. 1992.

Tatham et al., "20–nm Optical Wavelength Conversion Using Nondegenerate Four–Wave Mixing," IEEE Photonics Technology Letter, vol. 5, No. 11, pp. 1303–1305, Nov. 1993.

Mori et al., "Group velocity dispersion measurement using supercontinuum picosecond pulses generated in an optical fibre," Electronics Letter, vol. 29, No. 11, pp. 987–988, May 27, 1993.

Jopson et al., "Polarisation–independent phase conjugation of lightwave signals," Electronics Letters, vol. 29, No. 25, pp. 2216–2217, Dec. 9, 1993.

Morioka et al., "Multi–WDM–Channel, Gbit/s Pulse Generation from a Single Laser Source Utilizing LD–Pumped Supercontinuum in Optical Fibers," IEEE Photonics Technology Letters, vol. 6, No. 3, pp. 365–368, Mar. 1994.

Inoue et al., "Polarisation insensitive wavelength conversion using a light injected DFB–LD with a loop configuration," Electronics Letters, vol. 30, No. 5, pp. 438–439, Mar. 3, 1994.

Morioka et al., Tunable error–free optical frequency conversion of a 4ps optical short pulse over 25nm by four–wave mixing in a polarisation maintaining optical fibre, Electronics Letters, vol. 30, No. 11, pp. 884–885, May 26, 1994.

Takara et al., "100Gbit/s optical waveform measurement with 0.6ps resolution optical sampling using subpicosecond supercontinuum pulses," Electronics Letters, vol. 30, No. 14, pp. 1152–1153, Jul. 7, 1994.

Chung et al., "1.7Gbit/s transmission over 165km of dispersion–shifted fibre using spectrum–sliced fibre amplifier light source," Electronics Letters, vol. 30, No. 17, pp. 1427–1428, Aug. 18, 1994.

Lacey et al., "Four–channel WDM optical phase conjugator using four–wave mixing in a single semiconductor optical amplifier," Electronics Letters, vol. 31, No. 9, pp. 743–744, Apr. 27, 1995.

Morioka et al., "100Gbit/s×4 ch, 100km repeaterless TDM–WDM Transmission using a single supercontinuum source," Electronics Letters, vol. 32, No. 5, pp. 468–470, Feb. 29, 1996.

Mahric et al., "Broadband fiber optical parametric amplifiers," Optics Letters, vol. 21, No. 8, pp. 573–575, Apr. 15, 1996.

Hedekvist et al., "Polarization Dependence and Efficiency in a Fiber Four–Wave Mixing Phase Conjugator with Orthogonal Pump Waves," IEEE Photonics Technology Letters, vol. 8, No. 6, pp. 776–778, Jun. 1996.

White et al.; "Optical Fiber Components and Devices," Optical Fiber Telecommunications, Ch. 7, pp. 267–319, 1997.

Sanjoh et al., "Multiwavelength Light Source with Precise Frequency Spacing Using a Mode–Locked Semiconductor Laser and an Arrayed Waveguide Grating Filter," IEEE Photonics Technology Letters, vol. 9, No. 6, pp. 818–820, Jun. 1997.

Holloway etal., "Multiwavelength Source for Spectrum–Sliced WDM Access Networks and LAN's," IEEE Photonics Technology Letters, vol. 9, No. 7, pp. 1014–1016, Jul. 1997.

Lacey et al., "Four–Channel Polarization–Insensitive Optically Transparent Wavelength Converter," IEEE Photonics Technology Letters, vol. 9, No. 10, pp. 1355–1357, Oct. 1997.

Mori et al., "Flatly broadened supercontinuum spectrum generated in a dispersion deceasing fibre with convex dispersion profile," Electronics Letters, vol. 33, No. 21, 2 pages, Oct. 9, 1997.

Yang et al., "Demonstration of Two–Pump Fibre Optical Parametric Amplification," Electronics Letters, vol.33, No. 21, pp. 1812–1813, Oct. 9, 1997.

Okuno et al., "Generation of Ultra–Broad–Band Supercontinuum by Dispersion–Flattened and Decreasing Fiber," IEEE Photonics Technology Letters, vol. 10, No. 1, pp. 72–74, Jan. 1998.

Veselka et al., "A Multiwavelength Source Having Precise Channel Spacing for WDM Systems," IEEE Photonics Technology Letters, vol. 10, No. 7, pp. 958–960, Jul. 1998.

Edagawa et al., "Novel Wavelength Converter Using an Electroabsorption Modulator," IEICE Transactions in Electronics, vol. E81–C, No. 8, pp. 1251–1257, Aug. 1998.

Yang et al., "Crosstalk reduction by carrier suppression in an analogue WDM optical communication system," Electronics Letters, vol. 34, No. 22, 3 pages, Oct. 29, 1998.

Yamashita et al., "Polarization Independent, All–Fiber Phase Conjugation Incorporating Inline Fiber DFB Lasers," IEEE Photonics Technology Letters, vol. 10, No. 10, pp. 1407–1409, Oct. 1998.

Kim et al., "Low energy, enhanced supercontinuum generation in high nonlinearity dispersion–shifted fibers," CLEO'99/Wednesday Morning, paper CWA7, pp. 224–225, 1999.

Nakazawa et al., "Random evolution and coherence degradation of a higher–order optical soliton train in the presence of noise," Optics Letters, vol. 24, No. 5, pp. 318–320, Mar. 1, 1999.

Grandpierre et al., "Theory of Stimulated Raman Scattering Cancellation in Wavelength–Division–Multiplexed Systems via Spectral Inversion," IEEE Photonics Technology Letters, vol. 11, No. 10, pp. 1271–1273, Oct. 1999.

Yu et al., "Wavelength conversion by use of four–wave mixing in a novel optical loop configuration," Optics Letters, vol. 25, No. 6, pp. 393–395, Mar. 15, 2000.

Ho et al., "Fiber optical parametric amplifier and wavelength converter with 208–nm gain bandwidth," Thursday Morning/CLEO, pp. 401–402, May 11, 2000.

Yu et al., "All–Optical Wavelength Conversion of Short Pulses and NRZ Signals Based on a Nonlinear Optical Loop Mirror," Journal of Lightwave Technology, vol. 18, No. 7, pp. 1007–1017, Jul. 2000.

Yu et al., "40 Gbit/s pulsewidth–maintained wavelength conversion based on a high–nonlinearity DSF–NOLM," Electronics Letters, vol. 36, No. 19, 2 pages, Sep. 14, 2000.

Boyraz et al., "10 Gb/s Multiple Wavelength, Coherent Short Pulse Source Based on Spectral Carving of Supercontinuum Generated in Fibers," Journal of Lightwave Technology, vol. 18, No. 12, pp. 2167–2175, Dec. 2000.

Boyraz, "Generation of S–Band Sources for DWDM Applications by Utilizing Nonlinear Effects in Silica Fibers," Department of Electrical Engineering and Computer Science, The University of Michigan at Ann Arbor, Dissertation Thesis Proposal, pp. 1–19, plus 11 drawing pages, Jan. 2001.

Boyraz, "Generation of Stable S–Band Sources from Existing WDM Sources in C–Band," Department of Electrical Engineering and Computer Science, The University of Michigan at Ann Arbor, Thesis Proposal, 25 pages, Jan. 2001.

Boyraz et al., "MI Based Wavelength Conversion with Low Polarization Sensitivity and X–Talk," Department of Electrical Engineering and Computer Science, The University of Michigan at Ann Arbor, 29 pages, May 25, 2001.

Walker, "Status and Challenges of Optical Fiber Amplifiers and Lasers," paper MB–1–3, pp. 12–14.

Kawanishi et al., "3 Tbit/s (160 Gbit/s×19 ch) OTDM/WDM Transmission Experiment," paper PDI, pp. 1–3.

Nowak et al., "Stable 200nm TDM/WDM source based on continuum generation in 2m of fiber," paper TuB3–1, pp. 10–12.

Tashiro et al., "1.5 W Erbium Doped Fiber Amplifier Pumped by the Wavelength Division–Multiplexed 1480 nm Laser Diodes with Fiber Bragg Grating," Optical Transmission Systems Group, paper WC2–1–3, pp. 213–213.

Kim et al., "150+ Channel Ultra DWDM Source with Nx10 GHz Spacing Utilizing Longitudinal Mode Slicing of Supercontinuum," OFC'00, ThA2–1, pp. 5–7.

* cited by examiner

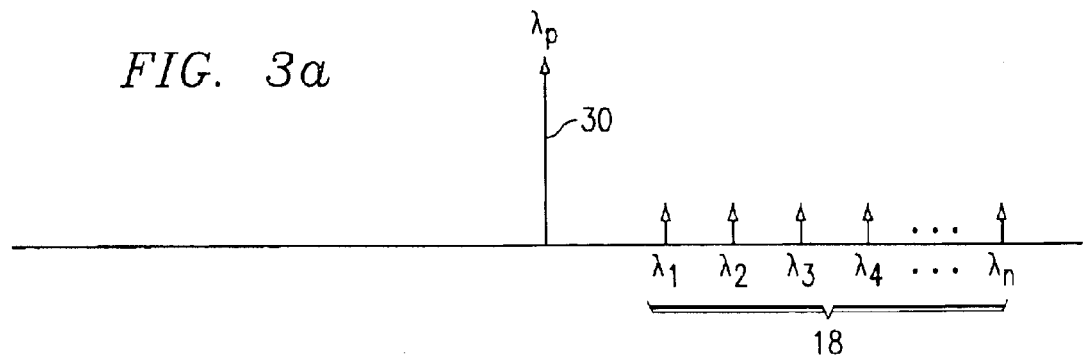
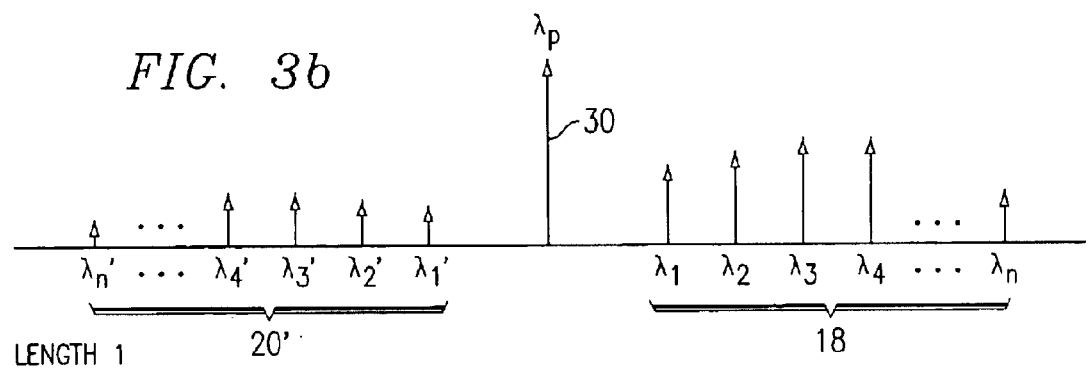
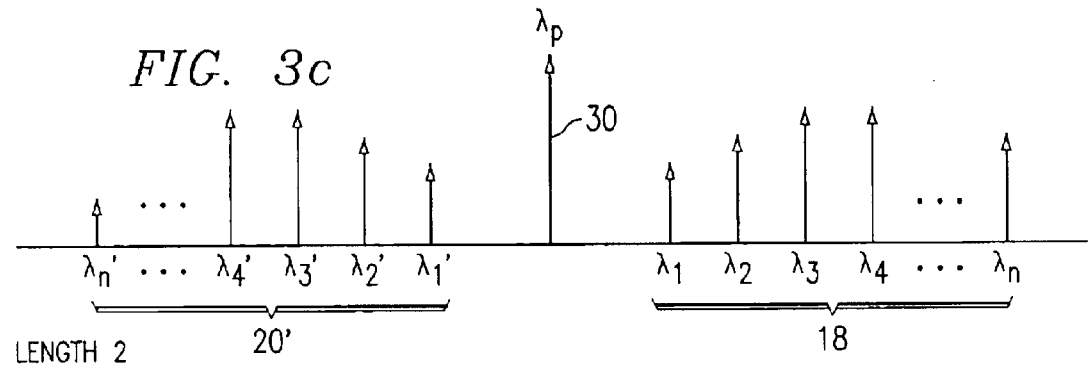
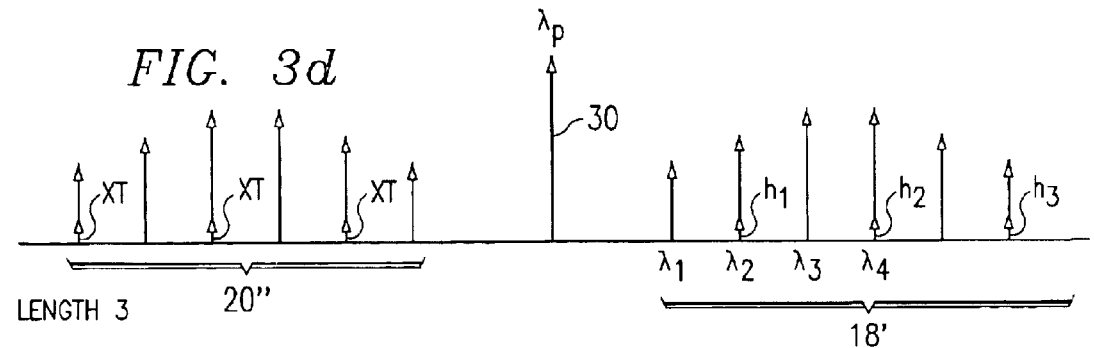

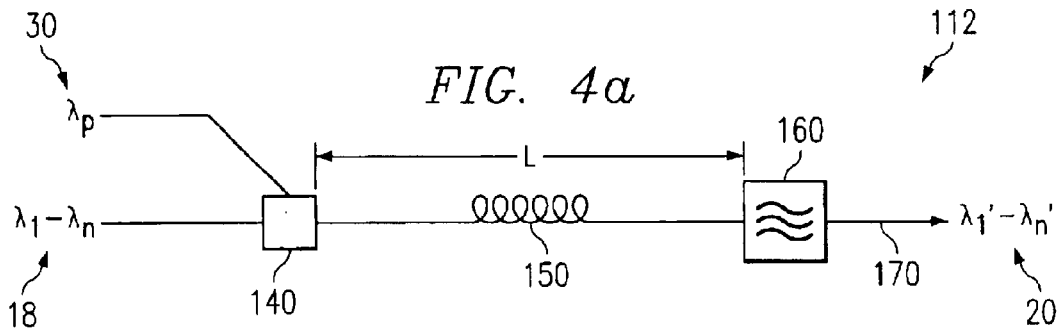
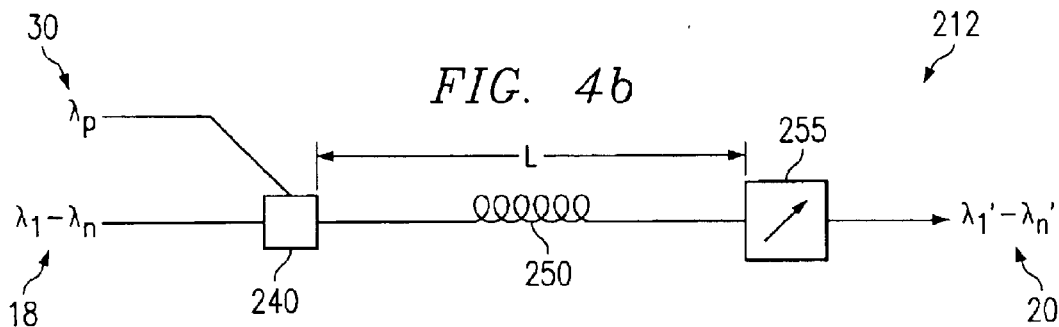
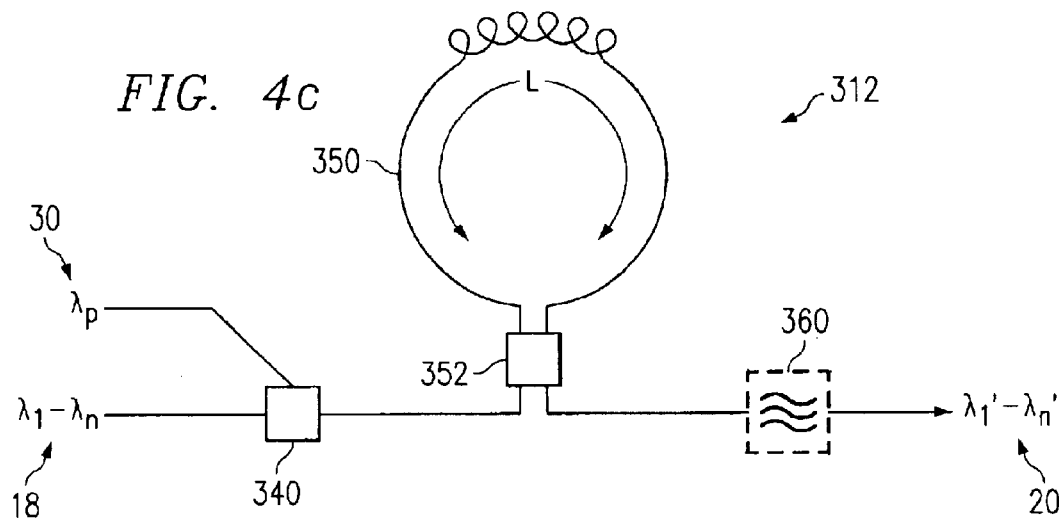
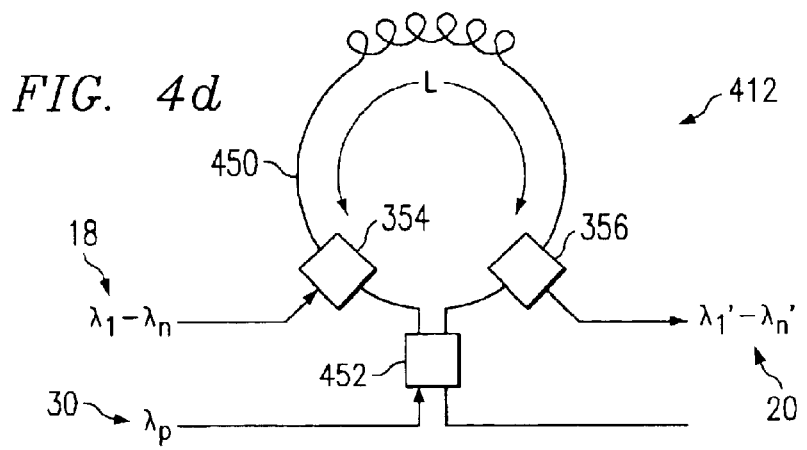

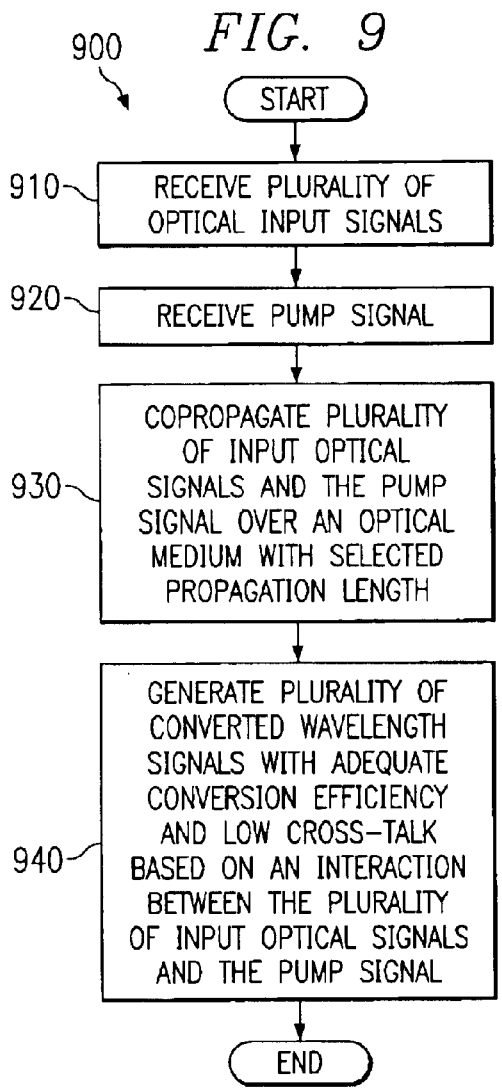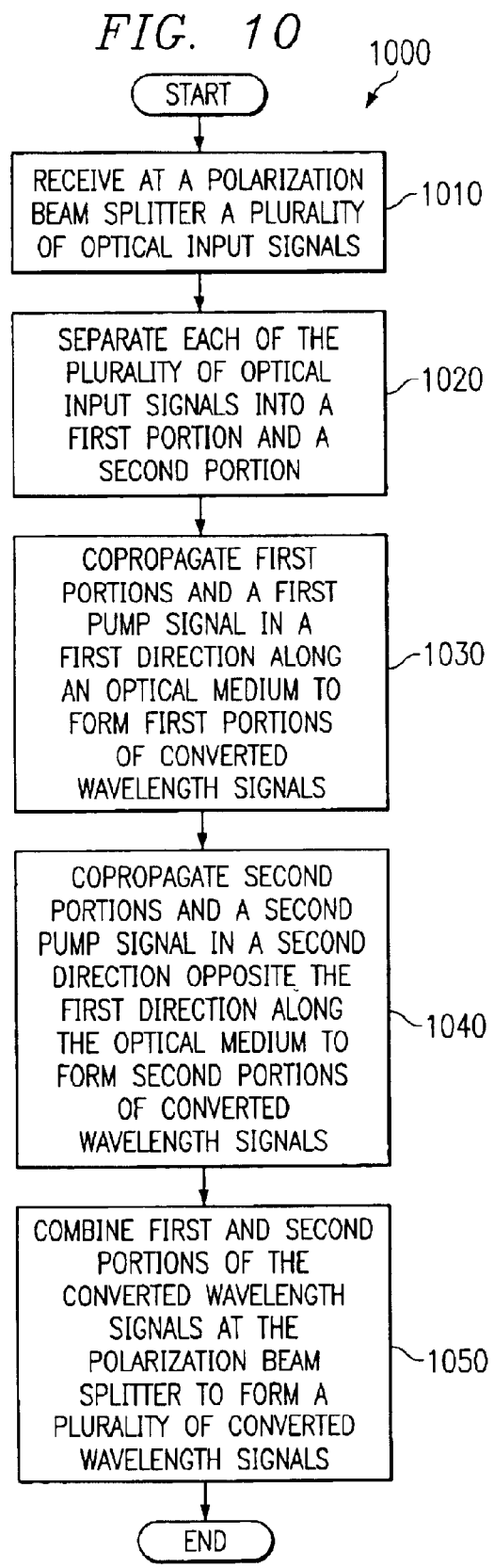

SYSTEM AND METHOD FOR CONVERTING A PLURALITY OF WAVELENGTHS

STATEMENT OF OTHER APPLICATIONS

This application claims priority to U.S. Provisional Patent Application No. 60/212,889, entitled New Wavelength Band Transmitters Using Modulational Instability Wavelength Converters, filed Jun. 20, 2000.

TECHNICAL FIELD OF THE INVENTION

The present invention relates generally to the field of communication systems, and more particularly to a system and method operable to facilitate wavelength conversion of a plurality of optical signals.

BACKGROUND OF THE INVENTION

Conventional wavelength converters typically operate to convert the wavelength of one optical signal from one wavelength to another. Problems associated with, for example, cross-talk between channels and/or polarization sensitivity have generally discouraged utilizing conventional wavelength converters in situations where it is desired to simultaneously convert numerous wavelengths using the same device.

SUMMARY OF THE INVENTION

The present invention recognizes a need for a method and apparatus operable to facilitate wavelength conversion of a plurality of optical signals. In accordance with the present invention, a system and method for providing wavelength conversion across a plurality of optical signals reduces or eliminates at least some of the shortcomings associated with other wavelength conversion mechanisms.

In one aspect of the invention, an apparatus operable to convert wavelengths of a plurality of optical signals comprises a coupler operable to receive a pump signal and a plurality of input signals each input signal comprising at least one wavelength different than the wavelengths of others of the plurality of input optical signals. The apparatus further includes an optical medium operable to receive the pump signal and the plurality of input signals from the coupler, wherein the pump signal and each of the plurality of input signals are synchronized to overlap at least partially during at least a part of the time spent traversing the optical medium to facilitate generation of a plurality of converted wavelength signals each comprising a wavelength that is different than the wavelengths of at least some of the plurality of input signals. Various embodiments can result in low cross-talk and/or low polarization sensitivity.

In another aspect of the invention, a method of generating a plurality of converted wavelength signals comprises receiving a plurality of optical input signals each comprising at least one distinct wavelength, and receiving a pump signal comprising a pump wavelength that is either shorter or longer than each of the wavelengths of the plurality of input optical signals. The method further comprises copropagating the plurality of input optical signals and the pump signal over a nonlinear optical medium and generating a plurality of converted wavelength signals based on an interaction between the plurality of input optical signals and the pump signal. Various incarnations of the method can result in multiple wavelength conversion with low cross talk and/or low polarization sensitivity.

In still another aspect of the invention, a system operable to convert a plurality of wavelengths comprises one or more optical transmitters operable to generate alone or in combination a plurality of optical input signals each comprising a wavelength in a first communications band. The system also includes a multiple wavelength converter coupled to the one or more optical transmitters and operable to approximately simultaneously generate, for each of the plurality of optical input signals, a converted wavelength signal comprising a wavelength in a second communications band.

In yet another aspect of the invention, a system operable to convert a plurality of wavelengths to facilitate protection switching comprises an optical medium operable to communicate optical signals comprising wavelengths residing in a first set of wavelengths or a second set of wavelengths, and a multiple wavelength converter coupled to the optical medium. The multiple wavelength converter is operable to receive a plurality of optical signals each comprising a wavelength in the first set of wavelengths and to approximately simultaneously generate, for each of the plurality of optical signals, a converted wavelength signal comprising a wavelength in the second set of wavelengths. The second set of wavelengths comprises a protection path for the first set of wavelengths. The converted wavelength signals can be generated prior to or in response to receiving notice of a fault.

Depending on the specific features implemented, particular embodiments of the present invention may exhibit some, none, or all of the following technical advantages. For example, various embodiments of the invention facilitates converting a plurality of wavelengths, even an entire band of wavelengths, while maintaining low cross-talk and/or maintaining polarization insensitivity. Some embodiments of the invention result in significant cost savings by reducing or eliminating the need for numerous costly filters to deal with harmonics created using other conversion approaches.

Some embodiments of the invention utilize a single polarization beam splitter to communicate with both inputs and outputs of a nonlinear optical medium facilitating wavelength conversion. This approach ensures that signals traversing the medium will experience identical or near identical path lengths and that the polarization of the input signals will be relatively aligned with the polarization of the pump signals.

Particular embodiments of the invention facilitate utilizing existing laser transmitters intended for use with the conventional communication band as transmitters in other communication bands. This aspect of the invention allows for initially generating input optical signals using, for example, C-band transmitters, and then utilizing a multiple wavelength converter to approximately simultaneously convert all of the input signals to wavelengths of another band, such as the S-band or L-band. This approach can save significant resources associated with developing new laser transmitters and can facilitate quick and inexpensive system upgrades.

Other technical advantages are readily apparent to one of skill in the art from the attached figures, description, and claims.

DESCRIPTION OF THE DRAWINGS

For a more complete understanding of the present invention, and for further features and advantages thereof, reference is now made to the following description taken in conjunction with the accompanying drawings, in which:

FIGS. 3a–3d are spectral diagrams illustrating various stages of wavelength conversion;

FIGS. 4a–4d are block diagrams showing various embodiments of a low cross-talk multiple wavelength converter;

FIG. 9 is a flow chart illustrating one example of a method of converting a plurality of wavelengths while maintaining low cross-talk; and FIG. 10 is a flow chart illustrating one example of a method of converting a plurality of wavelengths while maintaining low polarization sensitivity.

DETAILED DESCRIPTION OF THE INVENTION

Conventional optical communication systems have traditionally implemented optical signals having wavelengths in the conventional communications band (C-band). As the use of data intensive applications becomes increasingly prevalent, the need for additional bandwidth continues to escalate. One mechanism for supplying additional bandwidth in optical communication system is to utilize optical signals having wavelengths outside of the conventional communication band. For example, optical signals having wavelengths in the long communications band (L-band) or the short communications band (S-band) could be utilized to provide additional bandwidth.

One aspect of this invention recognizes that, for a number of reasons, it would be desirable to design a wavelength converter operable to convert a plurality of wavelengths, even a whole band of wavelengths, simultaneously using the same device. As used in this document, the concept of "simultaneously" converting wavelengths refers to at least beginning generation of one converted wavelength before another converted wavelength is fully generated. Interaction of pump signals with input optical signals to form converted wavelength signals is a sequential process continuing to occur as the signals traverse an optical medium. Simultaneous conversion does not require that all converted wavelengths be formed at precisely the same time.

Figure 1A:
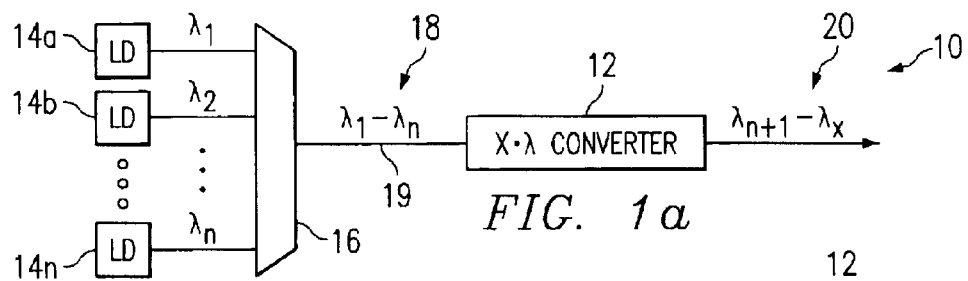
FIGS. 1a–1b are block diagrams of an exemplary multiple wavelength converters implemented in communication systems according to the teachings of the present invention.

FIG. 1a is a block diagram of an exemplary multiple wavelength converter 12 implemented in an optical communication system 10. In this example, system 10 includes a plurality of laser diodes 14a–14n. Each laser diode 14 is operable to generate an optical signal having at least one wavelength that is distinct from wavelengths generated by other laser diodes 14. Alternatively, a single laser transmitter operable to generate a plurality of wavelength signals could be implemented.

System 10 also includes an optical coupler 16. As a particular example, coupler 16 may comprise a wavelength division multiplexer (WDM) operable to receive a plurality of signals having different wavelengths and to combine those signals into a wavelength division multiplexed signal, a dense wavelength multiplex signal, or other signal carrying multiple wavelengths.

System 10 includes a multiple wavelength converter 12 operable to receive the plurality of input optical signals 18 having wavelength $\lambda_1$–$\lambda_n$ and to generate a plurality of converted wavelength signals $\lambda_1$–$\lambda_n$. In particular embodiments, multiple wavelength converter 12 can comprise a polarization insensitive and/or low cross-talk wavelength converter.

One application for multiple wavelength converter is as a multiple wavelength converter facilitating use of transmitters designed to operate at one wavelength to produce optical signals at other wavelengths. For example, a multiple wavelength converter could be used to facilitate generation of optical signals in the S-band and/or the L-band using laser transmitters designed to produce signals in the C-band of wavelengths. Optical signals having wavelengths in the C-band could first be produced using conventional laser transmitters, and then be converted to another band using a multiple wavelength converter. This approach allows service providers to offer services in alternative communications bands without incurring significant expenses associated with designing and/or implementing new lasers operable to generate signals in the alternative bands.

Figure 1B:
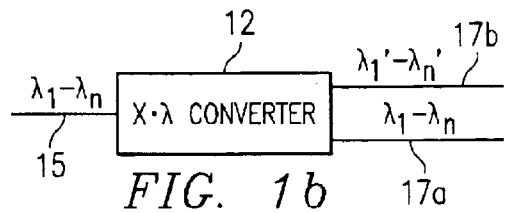

FIG. 1B is a block diagram showing a similar multiple wavelength converter 12 implemented in a protection switching scheme. In the event of a full or a partial fiber cut, or other event affecting fiber carrying one band of wavelengths but not another band of wavelengths, or affecting one fiber and not another fiber, a band converter would be useful in switching the optical traffic utilizing the disabled band to another band or bands of wavelengths.

Wavelength converter 12 in FIG. 1B couples to optical medium 15 comprising a first communication path 17a and a second communication path 17b. In this example, first communication path 17a comprises a first fiber and second communication path 17b comprises a second fiber. Alternatively, paths 17a and 17b could reside as separate portions of a common fiber.

In this example, first communication path 17a carries optical traffic on wavelengths $\lambda_1$–$\lambda_n$. Second communication path 17b comprises a protection path operable to carry wavelengths $\lambda_1$–$\lambda_n$. Multiple wavelength converter 12 can convert wavelengths $\lambda_1$–$\lambda_n$ to wavelengths $\lambda_1$–$\lambda$ for communication over first communication path 17 a and/or second communication path 17b. In one example, wavelength converter 12 may convert and propagate a protection version of the traffic to the converted wavelengths ready for switching in the event of a fault. In another example, wavelength converter 12 could convert the normal traffic to protection traffic upon detecting a fault. The fault could be associated, for example, with the communication path or the optical signals themselves.

As a particular example, communication paths 17a and 17b could facilitate communication of separate communication bands. For example, first communication path 17a could carry signals having wavelengths in the C-band, while protection path 17b could carry signals comprising wavelengths from the S-band or the L-band.

These examples illustrate just some of the variety of applications for which a multiple wavelength converter would be advantageous.

Figure 2A:
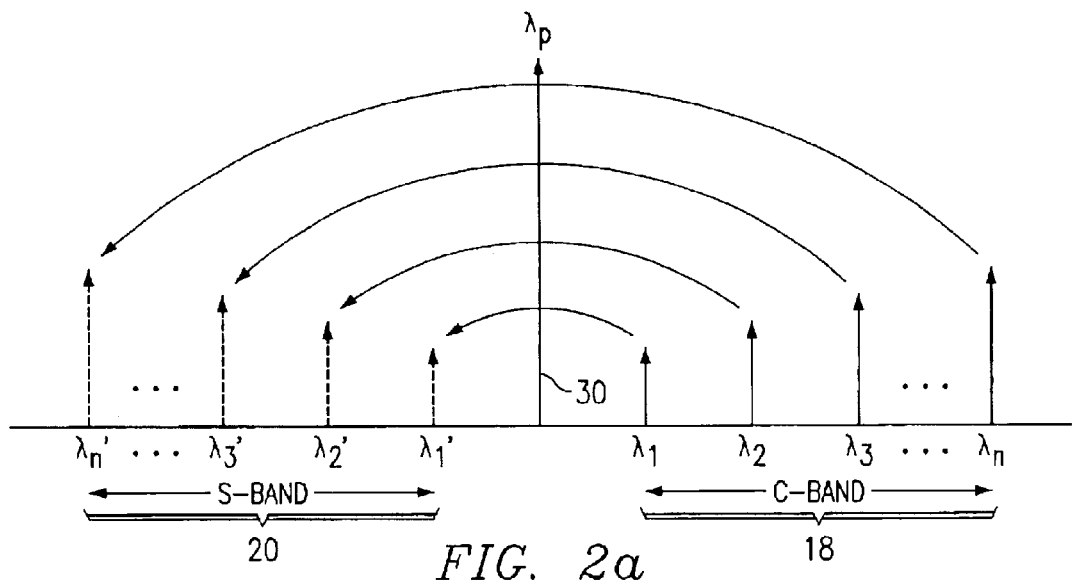
FIGS. 2a–2b are spectral diagrams illustrating various operational aspects of particular embodiments of a multiple wavelength converter.
Figure 2B:
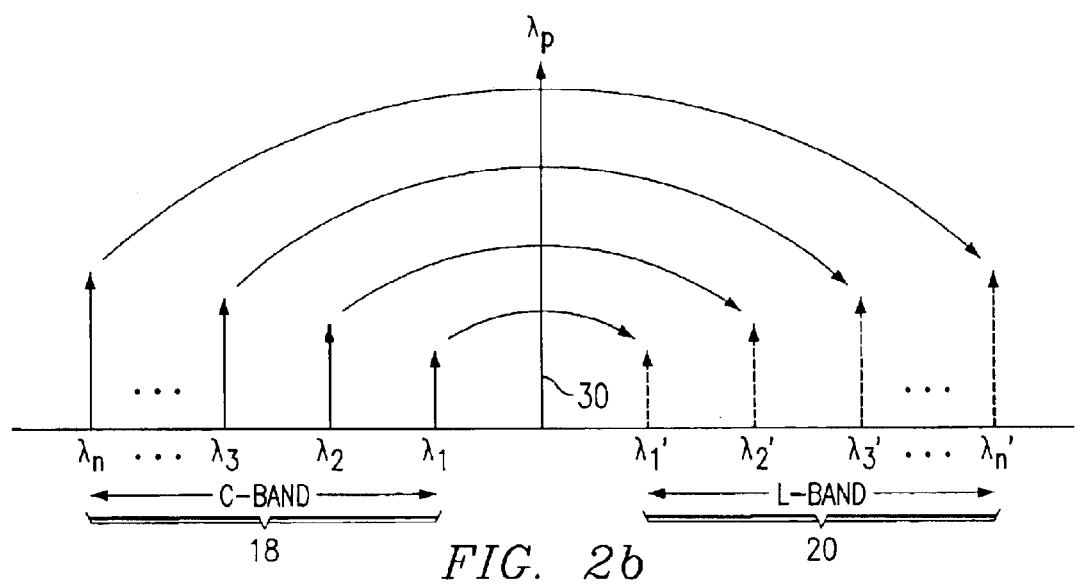

FIGS. 2a–2b are spectral diagrams illustrating various operational aspects of particular embodiments of a multiple wavelength converter 12. In operation, multiple wavelength converter 12 receives a plurality of input optical signals 18 having wavelengths $\lambda_1$–$\lambda_n$. In this particular example, input optical signals 16 comprise signals from the C-band. Input optical signals 18 could alternatively reside in another communications band.

In operation, multiple wavelength converter 12 introduces a pump signal 30 having wavelength $\lambda_p$ so that pump signal 30 copropagates with input optical signals 18 along a nonlinear optical medium of wavelength converter 12. Wavelength $\lambda_p$ of pump signal 30 is selected to be either shorter or longer than each of the wavelengths of optical input signals 18. In this manner, as pump signal 30 interacts with optical input signals 18 as those signals traverse the nonlinear optical medium, a mirror image of optical input signals 18 is generated at wavelengths residing spectrally opposite from optical input signals 18 and pump signal 30. As used in this document, the term "mirror image" is intended to denote a situation where wavelengths of the input signals residing on one side of the pump wavelength are reflected to the other side of the pump signal by approximately a distance equal to that signal's distance from the pump signal. Crowning effects that can sometimes result in the amplitudes of the converted wavelength signals not precisely matching the amplitudes of each of the input signals are not intended to exclude a spectrum from being considered a "mirror image."

Converted wavelength signals 20 generated through interaction between pump signal 30 and input optical signals 18 result from a Chi-3 nonlinear effect or an effective Chi-3 nonlinear effect. Examples of these Chi-3 effects are four wave mixing (4WM), parametric amplification, and modulation instability. Modulation instability and parametric amplification occur where the wavelength of pump signal 30 is greater than the zero-dispersion wavelength ($\lambda_0$) of the nonlinear medium. Four Wave Mixing occurs where the wavelength of pump signal 30 is selected to be less than the zero-dispersion wavelength of the medium. An effective Chi-3 nonlinear effect can be achieved, for example, by cascading two or more media exhibiting a Chi-2 nonlinear effect. These are just a few examples of nonlinear phenomena that can be used to generate converted wavelength signals 20 by allowing a pump signal 30 to interact with optical input signals 18.

Although the examples shown in FIGS. 2a–2b depict converting a plurality of optical signals 18 from the C-band to another band, converter 12 could also operate to convert optical signals initially residing in the S-band or the L-band to another communication band. Moreover, multiple wavelength converter 12 could be used to convert multiple wavelengths within the same band. It is not necessary that the optical input signals and the converted wavelength signals reside in separate communication bands.

FIGS. 3A–3D are spectral diagrams illustrating various stages during the generation of converted wavelength signals 20. FIG. 3A shows a spectrum of input optical signals 18 and pump signal 30. In this example, it is desired to generate a plurality of converted wavelength signals 20 at wavelengths shorter than any of input optical signals 18. To facilitate this operation, the wavelength $\lambda_p$ of pump signal 30 is selected to reside between the wavelengths of input optical signals 18 and the wavelengths of converted optical signals 20 to be generated.

In operation, multiple wavelength converter 12 propagates pump signal 30 and input optical signals 18 so that pump signal 30 and input optical signals 18 overlap for at least a portion of their transmission time over the nonlinear optical medium. While these signals overlap, pump signal 30 interacts with input optical signals 18 to begin to generate an initial plurality of converted wavelength signals 20' as shown in FIG. 3B. The longer the span of the nonlinear medium over which pump signal 30 and optical input signals 18 overlap, the greater the interaction between those signals. FIG. 3B shows that over a short length of nonlinear optical medium allowing for little interaction between pump signal 30 and input signals 18, the amplitude of initial converted wavelength signals 20' is small compared to the amplitude of the original input signals 18.

FIG. 3C illustrates converted wavelength signals 20 after further interaction between pump signal 30 and input signals 18 over a longer span of nonlinear optical medium. At some point, depending on, for example, the characteristics of the nonlinear optical medium, the characteristics of pump signal 30, and/or the characteristics of input signals 18, a length of the nonlinear optical medium can be implemented that facilitates generation of converted wavelength signals 20 whose amplitudes approach the amplitudes of input signals 18. FIG. 3C shows one example of this scenario.

Applicants realize, however, that if the length of the nonlinear optical medium becomes too great, the interaction between pump signal 30 and other optical signals propagating along the optical medium creates harmonics as shown in FIG. 3D. These harmonics become interspersed throughout converted wavelength signals 20, resulting in cross-talk between the converted wavelength signals and the harmonics.

Single wavelength converters exist, which rely on a Chi-3 nonlinear effect to produce one converted wavelength signal. Traditionally, these converters have dealt with harmonics by implementing filters to separate the converted wavelength signal from the harmonic. In a multiple wavelength converter, relying solely on this approach to deal with the cross-talk caused by harmonics can be extremely expensive, or even impossible depending on the number of wavelengths being converted.

One aspect of some embodiments of this invention seeks to reduce cross-talk generated in converting multiple wavelengths of signals by selecting a propagation length of nonlinear optical medium that will provide adequate conversion efficiency but reduce the effects of cross-talk caused by harmonics in the converted wavelength spectrum. In particular, rather than relying solely on removal of harmonics from the converted wavelength spectrum, as single wavelength converter approaches have done, this approach seeks to optimize the length of the nonlinear optical medium to reduce generation of harmonics in the first place.

FIGS. 4A–4D are block diagrams illustrating various embodiments of low cross-talk multiple wavelength converters. FIG. 4A is a block diagram of one particular embodiment of a low cross-talk multiple wavelength converter 112. In this example, multiple wavelength converter 112 includes a coupler 140 operable to receive pump signal 30 having a wavelength $\lambda_p$ and input optical signals 18 having wavelengths ranging from $\lambda_1$–$\lambda_n$. Wavelength division multiplexers, optical taps, and polarization beam splitters are a few examples of devices that could be implemented as coupler 140.

Coupler 140 communicates with a nonlinear optical medium 150. Nonlinear optical medium 150 could comprise, any medium operable to facilitate interaction between pump signal 30 and optical input signals 18 to result in a Chi-3 or an effective Chi-3 nonlinear effect. A length of high nonlinearity fiber or a nonlinear crystal are examples of materials that could be implemented. Nonlinear optical medium 150 comprises a propagation length (L). Propagation length (L) represents a length over which pump signal 30 and optical signals 18 can interact to result in a Chi-3 or effective Chi-3 nonlinear effect and a corresponding reflection of optical signals 18 about pump wavelength $\lambda_p$. The propagation length (L) of nonlinear medium 150 is selected to provide adequate conversion efficiency to converted wavelengths 20, while minimizing cross-talk by preventing or reducing generation of harmonics in the spectrum of converted wavelength signals 20. Although the illustrated embodiment shows nonlinear optical medium 150 coupled directly to coupler 140, any optical medium could reside between coupler 40 and nonlinear optical medium 150.

In this particular example, multiple wavelength converter 112 includes a filter 160 operable to block particular wavelengths from propagating to output 170. As a particular example, filter 160 could be designed to block the wavelength of pump signal 30 and/or input optical signals 18, and to allow converted wavelength signals 20 to pass.

FIG. 4B is a block diagram of another embodiment of a low cross-talk multiple wavelength converter 212. Multiple wavelength converter 212 is similar in structure and function to converter 112 shown in FIG. 4A. Converter 212, however, implements a polarization filter 255 to block the pump wavelength $\lambda_p$.

FIG. 4C is a block diagram showing still another embodiment of a low cross-talk multiple wavelength converter 312. Nonlinear optical medium 350 of multiple wavelength converter 312 comprises a nonlinear optical looped mirror operable to receive input optical signals 18 and pump signal 30 from a coupler 352. In this embodiment, coupler 352 comprises a 2×2 dichroic coupler, which is 50:50 balanced at the pump wavelength $\lambda_p$ and 100:0 balanced for all other wavelengths.

In operation, coupler 352 propagates input optical signals 18 in a clockwise direction around loop 352, propagates approximately half of the pump power in a clockwise direction, and approximately half in a counter-clockwise direction. A pump wavelength filter 360 can be used to reflect pump light back to the coupler 352 if desired.

FIG. 4D illustrates another example embodiment of a low cross-talk multiple wavelength converter 412. In this example, multiple wavelength converter 412 includes a coupler 452 operable to communicate approximately half the power of pump signal 30 in a clockwise direction and approximately half of the power of pump signal 30 in a counter-clockwise direction. This embodiment also includes couplers 354 and 356 operable to introduce optical input signals 18 to loop 450 and to remove converted wavelength signals 20 from loop 450, respectively.

Regardless of the particular embodiment of the multiple wavelength converter 112, 212, 312, or 412, the propagation length of nonlinear optical media 150, 250, 350, and 450, respectively, are chosen to provide adequate conversion efficiency while reducing cross-talk by suppressing the onset of harmonics in the converted wavelength spectrum.

For example, some embodiments of multiple wavelength converters may generate converted wavelength signals 20 at a conversion efficiency of at least minus sixteen (−16) decibels while introducing a cross-talk of less than minus fourteen (−14) decibels over a wavelength range of at least seven (7) nanometers. Other embodiments may generate converted wavelength signals 20 at a conversion efficiency of at least 4.7 decibels while introducing a cross-talk of less than minus twenty-seven (−27) decibels over a wavelength range of at least thirty (30) nanometers.

Many communication systems require bit error rates of no more than $10^{-9}$, or even $10^{-10}$. A bit error rate of $10^{-9}$ corresponds to a cross talk of approximately −17 decibels with a 0.5 decibel power penalty. A bit error rate of $10^{-10}$ corresponds to a cross talk of approximately −25 decibels with a 0.5 decibel power penalty. One aspect of the invention facilitates meeting these requirement through, for example, appropriate selection of a propagation length of the converter. In this manner, multiple wavelengths can be converted while maintaining acceptable bit error rates.

These performance parameters are presented for exemplary purposes only. Wavelength converters having other performance characteristics are not intended to be excluded from the scope of the invention.

Figure 5:
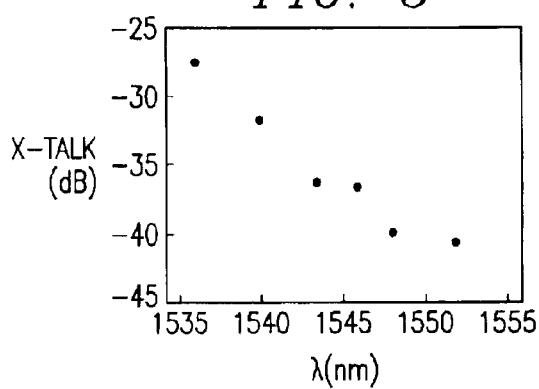
FIG. 5 is a graph illustrating cross-talk performance of one embodiment of a multiple wavelength converter constructed according to the teachings of the present invention.

FIG. 5 is a graph showing experimental results of measured cross-talk for a particular embodiment of a low cross-talk multiple wavelength converter. In this example, the pump wavelength $\lambda_p$ was selected to be 1,532 nanometers and the pump power set to 860 milliwatts. The signal power per channel comprises 7 microwatts. The nonlinear optical medium was selected to be a high nonlinearity fiber having a zero-dispersion wavelength of approximately 1,530 nanometers, a loss of approximately one decibel per kilometer, a nonlinearity constant ($\gamma$) of approximately 9.9 watts$^{-1}$kilometer$^{-1}$, and a dispersion slope ($\Delta D/\Delta \lambda$) of approximately 0.0265 picoseconds/nanometer$^2$*kilometer. In this example, the propagation length 150 comprises 315 meters. Using this configuration, a conversion efficiency of at least 4.7 decibels is obtained, while cross-talk consistently remains at −27 decibels or less over the converted bandwidth.

The results depicted and configuration associated with in FIG. 5 are for exemplary purposes only. Other fiber types and signal characteristics could be implemented without departing from the scope of the invention.

Figure 6:
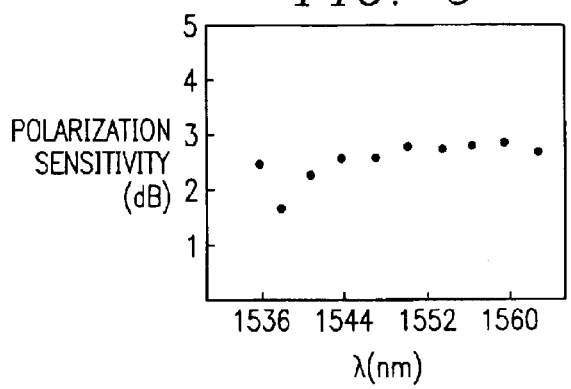
FIG. 6 is a graph illustrating polarization sensitivity associated with one embodiment of a multiple wavelength converter.

FIG. 6 is a graph illustrating polarization sensitivity measured for the low cross-talk multiple wavelength converter discussed with respect to FIG. 5. Without implementing a polarization control mechanism, the polarization of pump signal 30 and the polarization of each input optical signal 18 can vary over time. Depending on the relative polarizations of each of those signals, the gain experienced by the wavelength converter can vary. The term polarization sensitivity refers to the difference between the maximum gain and the minimum gain of the device over time. As shown in FIG. 6, while a device such as those shown in FIGS. 4A–4D can result in a reduction of cross-talk, without further modification, those devices can be subject to significant polarization sensitivity. With respect to the particular example discussed in FIG. 5, that device exhibits polarization sensitivities averaging approximately 2.5 decibels. One aspect of the invention seeks to minimize polarization sensitivity in multiple wavelength converters.

Figure 7A:
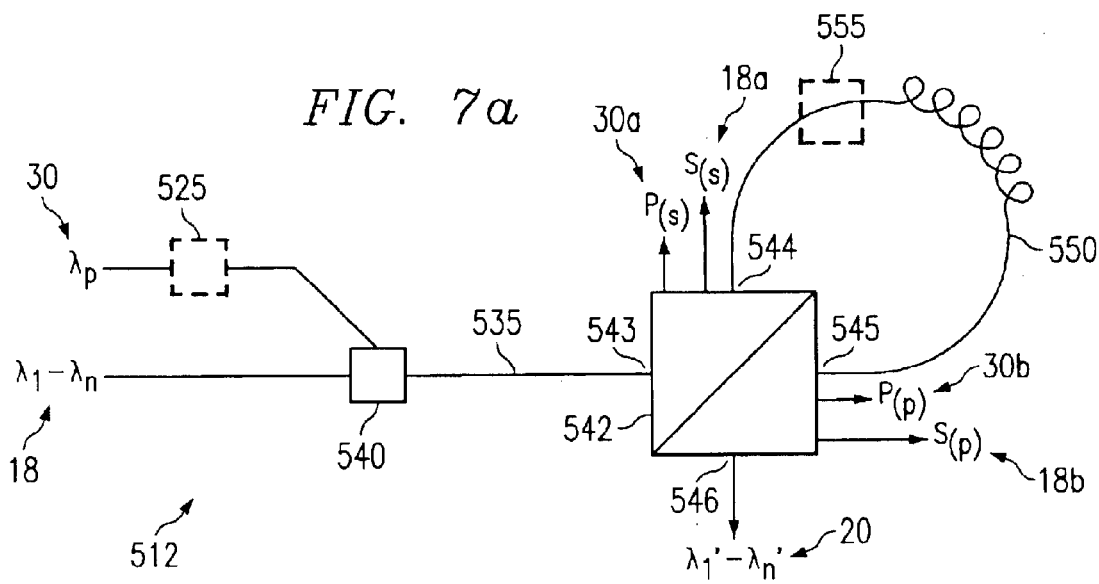
FIGS. 7a–7c are block diagrams showing various embodiments of polarization insensitive multiple wavelength converters.
Figure 7B:
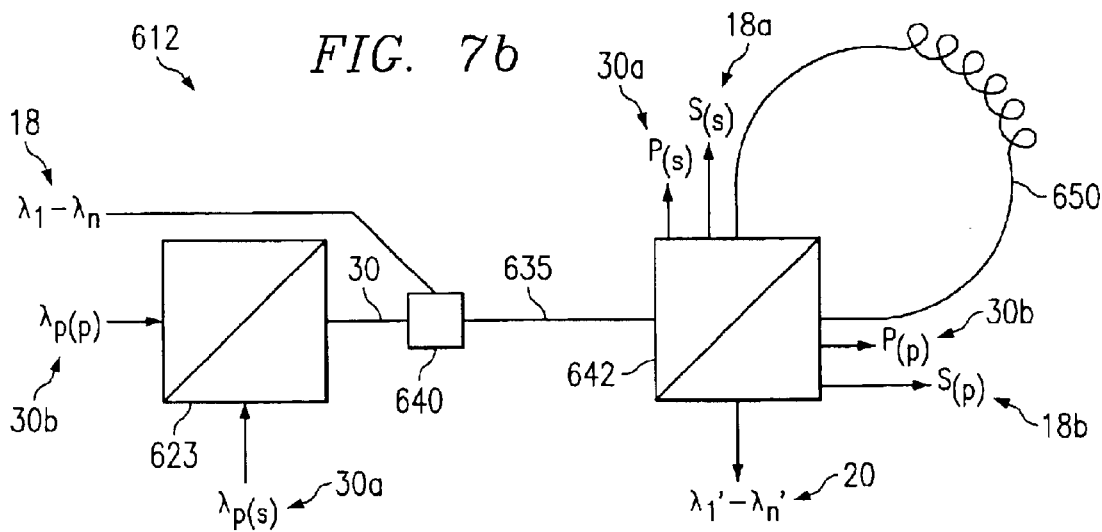
Figure 7C:
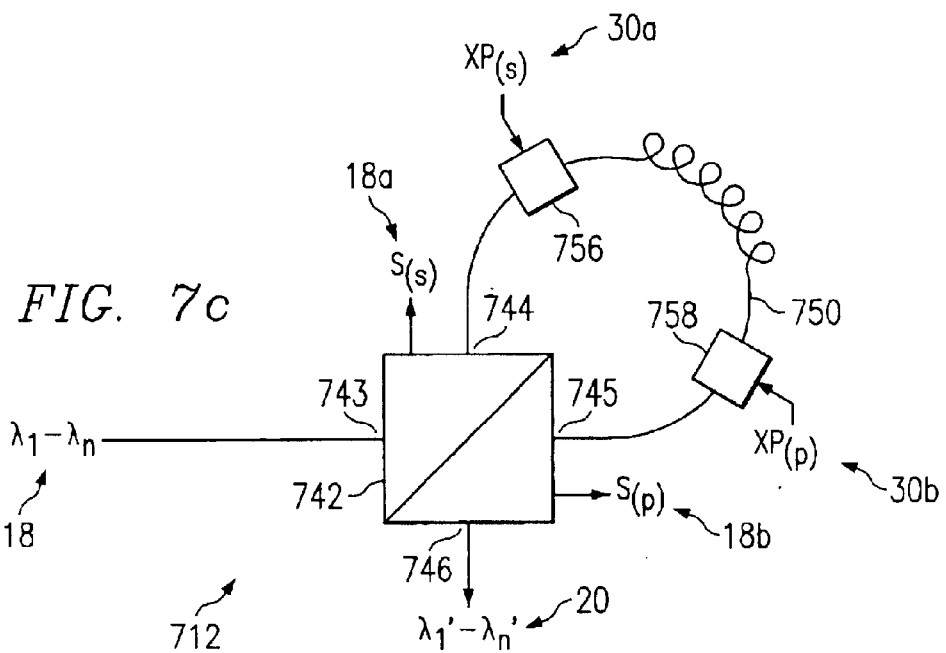

FIGS. 7A–7C are block diagrams of various embodiments of polarization insensitive multiple wavelength converters. Multiple wavelength converter 512 shown in FIG. 7A includes a coupler 540 operable to receive pump signal 30 and optical input signals 18. Coupler 540 may comprise, for example, a wavelength division multiplexer, an optical tap, or a polarization beam splitter. Coupler 540 communicates with a polarization beam splitter 542. In this example, polarization beam splitter 542 comprises a plurality of ports. An input port 543 receives pump signal 30 and input optical signals 18. Ports 544 and 545 communicate with a nonlinear optical medium 550. In this example, nonlinear optical medium 550 couples directly to ports 544 and 545. Alternatively, additional optical links, such as optical fibers, could couple nonlinear optical medium 550 to ports 544 and 545. In this example, nonlinear optical medium 550 comprises a high nonlinearity fiber. Alternatively, nonlinear optical medium 550 could comprise a nonlinear crystal, or other medium operable to facilitate a Chi-3 or an effective Chi-3 effect due to interaction between pump signal 30 and input optical signals 18.

Polarization beam splitter 542 also includes an output port 546. Optical signals can be directed from polarization beam splitter 542 through output port 546, through input port 543, or through a combination of those ports. Where converted wavelength signals 20 exit polarization beam splitter 542 through input port 543, a circulator or other device could be used to redirect converted wavelength signals 20 from the path of input signals 18.

A polarization controller 555 could be used to control direction of signals traversing optical medium 550 by maintaining or adjusting polarizations of those signals. Alternatively, optical medium 550 could comprise a polarization maintaining fiber to ensure that all or most of the converted wavelength signals 20 leave polarization beam splitter 542 through a common port.

In operation, polarization beam splitter 542 receives pump signal 30 and optical input signals 18 at input port 543. Polarization beam splitter 542 separates portions of the received signals having a first polarization from portions having a second polarization orthogonal to the first polarization. In this example, first portion 30*a* of pump signal 30 and first portions 18*a* of input optical signals 18 comprise a vertical (s) polarization, while second portion 30*b* of pump signal 30 and second portions 18*b* of optical input signals 18 comprise a horizontal (p) polarization.

Polarization beam splitter 542 communicates signal portions having the first polarization clockwise around loop 550 and communicates signal portions having the second polarization counter-clockwise around loop 550. Of course, leakage portions of the first polarization may travel in a counter-clockwise direction and leakage portions of the second polarization may travel in a clockwise direction. These circumstances are not intended to be outside of the scope of the invention.

Nonlinear optical medium 550 facilitates at least substantially unidirectional interaction between first portion 30*a* of pump signal 30 and first portions 18*a* of optical input signals 18 to generate first portions of converted wavelength signals 20 each having at least substantially the first polarization. Similarly, nonlinear optical medium 550 facilitates at least substantially unidirectional interaction between second portion 30*b* of pump signal 30 and second portions 18*b* of optical input signals 18 to generate second portions of converted wavelength signals 20 having at least substantially the second polarization.

Optical scattering that can typically occur as signals traverse an optical medium is not intended to be outside of the scope of the phrase "unidirectional interaction" as used herein.

Polarization beam splitter 542 combines the first and second portions of converted wavelength signals 20. In this example, polarization beam splitter 542 communicates converted wavelength signals 20 from output port 546. These signals could alternatively be communicated from another port, such as input port 543.

For low polarization sensitivity, it is desirable to ensure that first portion 30*a* of pump signal 30 and second portion 30*b* of pump signal 30 have at least approximately equal powers. Numerous mechanisms can accomplish this goal. For example, if it is desired to use a single pump signal, pump signal 30 can be launched at an angle of 45 degrees to ensure that approximately half of the power of pump signal 30 travels in each direction around loop 550. This can be implemented, for example, by implementing a polarization controller 525 operable to adjust the angle of pump signal 30 to approximately 45 degrees. In a particular embodiment, optical link 535 between coupler 540 and polarization beam splitter 542 could comprise a polarization maintaining fiber to ensure that the angle of pump signal 30 remains approximately 45 degrees when it reaches polarization beam splitter 542.

FIGS. 7B and 7C show alternative embodiments using separate pump signals to achieve similar results. For example, multiple wavelength converter 612 shown in FIG. 7B implements a first pump signal 30*a* having an approximately vertical polarization and a second pump signal 30*b* having an approximately horizontal polarization. First and second pump signals 30*a* and 30*b* are combined by a polarization beam splitter 623 to form pump signal 30 at an angle of approximately 45 degrees. Pump signal 30 and optical input signals 18 copropagate from coupler 640 to polarization beam splitter 642. Again, a polarization maintaining fiber 635 can be used to approximately maintain the polarization of pump signal 30 between coupler 640 and polarization beam splitter 642. At this point, multiple wavelength converter 612 operates in a similar manner to converter 512 described with respect to FIG. 7A.

Multiple wavelength converter 712 shown in FIG. 7C also implements two separate pump signals 30*a* and 30*b*, but combines those signals with optical input signals 18 within loop 750. In this embodiment, polarization beam splitter 742 receives input optical signals 18 at input port 743. Polarization beam splitter 742 directs signal portions having a first polarization in one direction around loop 750 and signal portions having a second polarization in an opposite direction around loop 750. In this particular example, signal portions 18*a* having a vertical polarization are directed in a clockwise direction around loop 750, while signal portions 18*b* having a horizontal polarization are directed in a counter-clockwise direction around loop 750.

In this example, multiple wavelength converter 712 includes couplers 756 and 758 residing between loop 750 and ports 744 and 745 of polarization beam splitter 742. First coupler 756 receives first pump signal 30*a* having a vertical polarization and combines pump signal 30*a* with portions 18*a* of optical input signals 18 also having a vertical polarization. Nonlinear optical medium 750 facilitates at least substantially unidirectional interaction between first pump signal 30*a* and first signal portions 18*a* to facilitate generation of first portions of converted wavelength signals 20 comprising instances of input signals 18 reflected about pump wavelength $\lambda_p$.

In a similar manner, coupler 758 combines second pump signal 30*b* having a horizontal polarization with second portions 18*b* of optical input signals 18 also having horizontal polarization. Nonlinear optical medium 750 facilitates at least substantially unidirectional interaction between the horizontally polarized signal portions to result in generation of second portions of converted wavelength signals 20. Polarization beam splitter 742 combines the first and second portions of the converted wavelength signals to form converted wavelength signals 20.

Implementing a single polarization beam splitter coupled to both inputs of a nonlinear optical medium provides significant advantages over approaches attempting to use multiple polarization beam splitters to join multiple physically separate optical paths. For example, Applicants recognize that using a single polarization beam splitter coupled to both ends of a nonlinear optical medium ensures that the multiple optical paths traveling along the same physical medium will always have identical lengths. In addition, this approach reduces the possibility that one optical path will be adversely affected by environmental forces, such as temperature or pressure variations, while the other is not.

Figure 8:
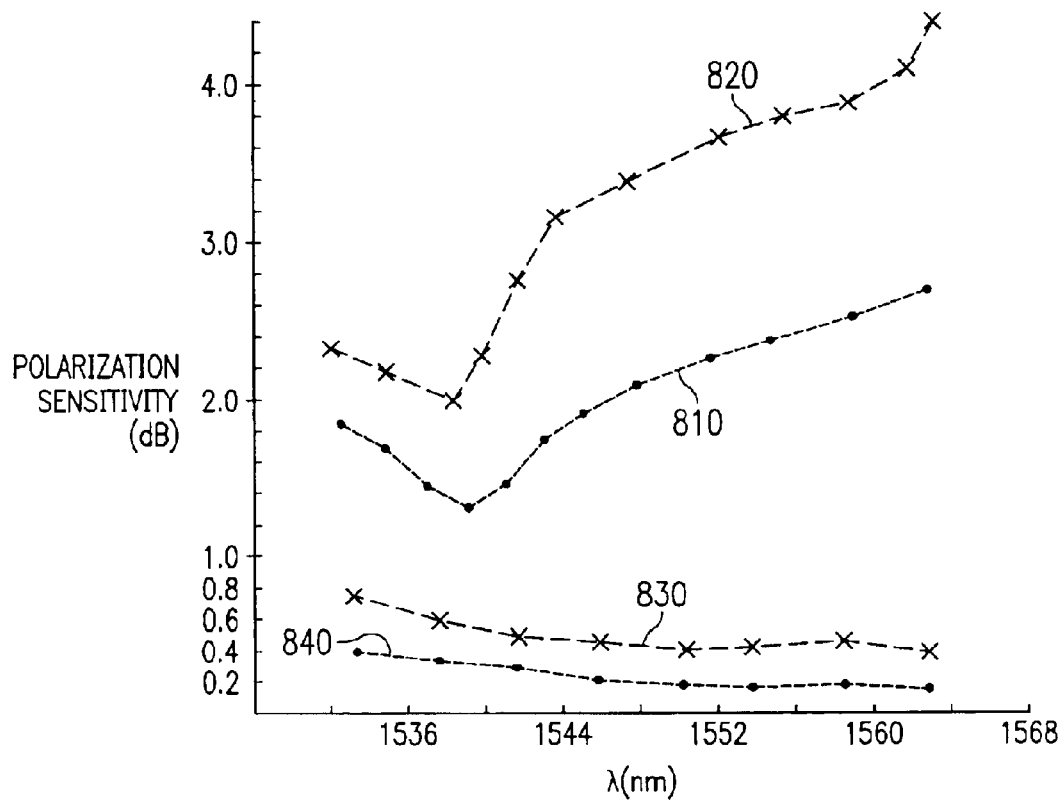
FIG. 8 is a graph illustrating improvements in polarization sensitivity realized by one embodiment of a polarization insensitive multiple wavelength converter.

FIG. 8 is a graph illustrating polarization sensitivities in various multiple wavelength converter configurations. Line 810 shows polarization sensitivity for a multiple wavelength converter configuration such as that shown in FIG. 4A for a propagation length of approximately 280 meters. Line 820 shows polarization sensitivity for the same configuration of a multiple wavelength converter using a propagation length of approximately 400 meters. Line 830 shows the reduction in polarization sensitivity obtained using a configuration such as that shown in FIG. 7A for a propagation length of approximately 400 meters. Line 840 shows polarization sensitivity for a similar configuration using a propagation length of approximately 280 meters.

As demonstrated here, implementing a multiple wavelength converter utilizing a single polarization beam splitter to communicate with both ends of a single nonlinear optical medium can result in a significant reduction in polarization sensitivity. Particular embodiments of these types of configurations exhibit polarization sensitivities of less than 2.0 decibels over wavelength ranges of at least seven (7) nanometers. In fact, some configurations have been shown to achieve polarization sensitivities of less than 0.6 decibels over wavelength ranges larger than thirty-five (35) nanometers.

Of course, aspects of the invention relating to reduction of polarization sensitivity can be combined with aspects of the invention relating to reduction of cross-talk. For example, by implementing a configuration such as those shown in FIGS. 7A–7C and by selection of the propagation length of the nonlinear optical medium in light of the characteristics of that medium and of the signals being processed, polarization insensitive multiple wavelength converters can be created with low levels of cross-talk.

FIG. 9 is a flow chart illustrating one example of a method 900 of converting the wavelengths of a plurality of optical signals while maintaining low levels of cross-talk. This example will be described using multiple wavelength converter 112 discussed with respect to FIG. 4a. Discussions relating to that particular configuration are intended for illustrative purposes only. Other embodiments of a multiple wavelength converter could be used without departing from the scope of the invention.

Method 900 begins at step 910 where multiple wavelength converter 112 receives a plurality of optical input signals 18. Optical input signals 18 each comprise at least one wavelength distinct from the wavelengths of others of input signals 18. In a particular embodiment, each of input signals 1a may comprise a wavelength residing in a first subset of wavelengths, such as a communications band.

Multiple wavelength converter 112 receives pump signal 30 at step 920. Pump signal 30 comprises an optical signal having a wavelength that is either shorter than or longer than each of the wavelengths of optical signals 18. In this particular example, multiple wavelength converter 112 receives input signals 18 and pump signal 30 at an optical coupler 140.

Optical coupler 140 communicates pump signal 30 and input signals 18 to optical medium 150. Pump signal 30 and input signals 18 copropagate over optical medium 150 at step 930. During at least a portion of the time those signals traverse optical medium 150, those signals overlap and interact to generate a plurality of converted wavelength signals at step 940. In particular, input signals 18 and pump signal 30 interact to cause a Chi-3 or effective Chi-3 nonlinear effect, which operates to generate an approximate mirror image of input signals 18 reflected about the wavelength of pump signal 30. At least some of the converted wavelength signals 20 resulting from this interaction reside within a subset of wavelengths distinct from the subset containing input signals 18. In a particular example, converted wavelength signals 20 reside in a separate communications band from input signals 18.

By appropriate selection of, for example, a propagation length of optical medium 150, multiple wavelength converter 112 achieves a desired conversion efficiency, while maintaining low cross-talk by reducing the creation of harmonics.

FIG. 10 is a flow chart showing one example of a method 1000 of converting the wavelengths of a plurality of signals while maintaining an acceptable polarization sensitivity. This example will be described with respect to multiple wavelength converter 512 as shown in FIG. 7a. Other embodiments of multiple wavelength converters could implement this or similar methods without departing from the scope of the invention.

Method 1000 begins at step 1010 where multiple wavelength converter 512 receives at polarization beam splitter 542 a plurality of optical input signals 18. Polarization beam splitter 542 separates each of the plurality of optical input signals 18 into a first portion and a second portion at step 1020. In this example, the first portion of 18a of each optical input signal 18 comprises a first polarization, for example a vertical polarization, while second portion 18b comprises a second polarization, for example a horizontal polarization.

Multiple wavelength converter 512 copropagates first portions 18a and first pump signal 30a in a first direction along nonlinear optical medium 550 at step 1030. Similarly, multiple wavelength converter 512 copropagates second portions 18b of input signals 18 along and second pump signal 30b in a second direction opposite from the first direction around nonlinear optical medium 550 at step 1040. In this example, first pump signal 30a and second pump signal 30b comprise two portions of a common pump signal 30 separated according to their respective polarizations. Pump signal 30, for example could be launched at an angle of 45 degrees so that polarization beam splitter 542 communicates approximately one half of pump signal 30 in each direction around optical medium 550. In another embodiment, first pump signal 30a and second pump signal 30b could comprise pump signals generated from separate pump sources. Multiple wavelength converters 612 and 712 of FIGS. 7b and 7c, respectively, illustrate examples of this type of embodiment.

As first portions 18a of input signal 18 and first pump signal 30a propagate along optical medium 550, they interact generating a Chi-3 or effective Chi-3 nonlinear effect. The Chi-3 nonlinear effect may comprise, for example, parametric amplification, modulation instability, or four wave mixing. The interaction between input signal 18a and pump signal 30a generates first portions of converted wavelength signals 30, which are received at port 545. Likewise, interaction between second portions 18b and second pump signal 30b along optical medium 550 generate second portions of converted wavelength signals 20, which are received at port 544.

Multiple wavelength converter 512 combines the first and second portions of converted wavelength signals 20 at step 1050 to form the plurality of converted wavelength signals 20. Converted wavelength signals 20 comprise an approximate mirror image of input optical signals 18 reflected about the wavelength of pump signal 30. Converted wavelength signals 20 can be output from multiple wavelength converter 512 through one or more ports. In the illustrated embodiment, all converted wavelength signals 20 are output from port 546. To insure that all converted wavelength signals can be removed from a single port, a polarization controller 555 can be used to maintain polarization of the signals as they traverse optical medium 550. Alternatively, optical medium 550 could comprise a polarization maintaining fiber.

In another embodiment, converted wavelength signals 20 could be output from input port 543. In that case, a circulator, or other device operable to redirect optical signals could be used to direct converted wavelength signals 20 from the path of signals incoming to port 543.

Using a single polarization beam splitter coupled to a common optical medium can provide significant advantages in controlling the polarization sensitivity of the converter. Particular embodiments may exhibit polarization sensitivities less than 2 decibels, or even less than 0.6 decibels over a wavelength range of more than thirty-five (35) nanometers, depending on particular configurations implemented. In addition, the propagation length of the optical medium in this case could also be selected to result in low cross-talk over the band of converted wavelengths signals 20.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An apparatus operable to convert wavelengths of a plurality of optical signals, the apparatus comprising:
   a coupler operable to receive a pump signal and a plurality of input signals each input signal comprising at least one wavelength different than the wavelengths of others of the plurality of input optical signals;
   an optical medium operable to receive the pump signal and the plurality of input signals from the coupler, wherein the pump signal and each of the plurality of input signals are synchronized to overlap at least partially during at least a part of the time spent traversing the optical medium to facilitate generation of a plurality of converted wavelength signals each comprising a wavelength that is different than the wavelengths of at least some of the plurality of input signals;
   wherein a cross-talk between the converted wavelength signals comprises less than minus fourteen decibels (−14 dB) over a wavelength range of at least seven (7) nanometers or wherein a polarization sensitivity of the converter is less than 1.2 decibels over a wavelength range of at least seven (7) nanometers.

2. The apparatus of claim 1, wherein the coupler comprises a wavelength division multiplexer.

3. The apparatus of claim 1, wherein the optical medium is coupled directly to the coupler.

4. The apparatus of claim 1, wherein the plurality of input signals comprise signals in a first band of wavelengths and wherein the plurality of converted wavelength signals comprise signals in a second band of wavelengths.

5. The apparatus of claim 4, wherein the first band comprises the conventional band (C-band) of wavelengths and wherein the second band comprises either the short band (S-band) or the long band (L-band) of wavelengths.

6. The apparatus of claim 1, wherein a wavelength of the pump signal resides spectrally between wavelengths of at least some of the plurality of input signals and wavelengths of at least some of the plurality of converted wavelength signals.

7. The apparatus of claim 6, wherein the spectrum of the plurality of converted wavelength signals comprises an approximate mirror image of the spectrum of the plurality of input signals.

8. The apparatus of claim 1, wherein the optical medium comprises a medium operable to facilitate a Chi-3 or an effective Chi-3 nonlinear effect resulting in generation of the converted wavelength signals comprising instances of the optical input signals reflected about a wavelength of the pump signal.

9. The apparatus of claim 8, wherein the Chi-3 or effective Chi-3 nonlinear effect comprises parametric amplification, modulation instability, or four wave mixing.

10. The apparatus of claim 1, wherein the optical medium comprises a propagation length selected to result in a conversion efficiency of at least 4.7 decibels and a cross talk of −27 decibels or less in the converted wavelength signals over a wavelength range of at least 30 nanometers.

11. The apparatus of claim 1, wherein the optical medium comprises a first end and a second end, and wherein the coupler comprises a polarization beam splitter coupled between the first end and the second end of the optical medium, the polarization beam splitter operable to communicate portions of received signals having a first polarization in one direction through the optical medium and to communicate portions of the received signals having a second polarization in a second direction through the optical medium.

12. The apparatus of claim 11, wherein the optical medium facilitates generation of the plurality of converted wavelength signals through at least substantially unidirectional interaction between portions of the pump signal and input having the first polarization and at substantially unidirectional interaction between portions of the pump signal and input signals having the second polarization.

13. The apparatus of claim 1, wherein the polarization sensitivity comprises 0.6 decibels or less over a wavelength range of at least 35 nanometers.

14. A multiple wavelength converter, comprising:
   a coupler operable to receive a pump signal and a plurality of input optical signals each having at least one wavelength distinct from wavelengths of others of the plurality of input optical signals;
   a nonlinear optical medium operable to facilitate interaction between the pump signal and the plurality of input optical signals to generate a plurality of converted wavelength optical signals each comprising a wavelength different than at least some of the wavelengths of the plurality of input optical sign;
   wherein the nonlinear optical medium comprises a propagation length selected to result in conversion efficiency of at least minus sixteen decibels (−16 dB) and a cross-talk associated with the converted wavelength optical signals of minus fourteen decibels (−14 dB) or less over a wavelength range of at least seven (7) nanometers.

15. The multiple wavelength converter of claim 14, wherein the coupler comprises a wavelength division multiplexer.

16. The multiple wavelength converter of claim 14, wherein the plurality of input signals comprise signals in a first band of wavelengths and wherein the plurality of converted wavelength signals comprise signals in a second band of wavelengths.

17. The multiple wavelength converter of claim 16, wherein the first band comprises the conventional band (C-band) of wavelengths and wherein the second band comprises either the short band (S-band) or the long band (L-band) of wavelengths.

18. The multiple wavelength converter of claim 14, wherein the optical medium comprises a medium operable to facilitate a Chi-3 or effective Chi-3 nonlinear effect resulting in generation of the converted wavelength signals comprising instances of the optical input signals reflected about a wavelength of the pump signal.

19. The multiple wavelength converter of claim 18, wherein the Chi-3 or effective Chi-3 nonlinear effect comprises parametric amplification, modulation instability, or four wave mixing.

20. The multiple wavelength converter of claim 14, wherein the optical medium comprises a first end and a second end, and wherein the coupler comprises a polarization beam splitter coupled between the first end and the second end of the optical medium, the polarization beam splitter operable to communicate portions of received signals having a first polarization in one direction through the optical medium and to communicate portions of the received signals having a second polarization in a second direction through the optical medium.

21. The multiple wavelength converter of claim 20, wherein thr optical medium facilitates generation of the plurality of converted wavelength signals through at least substantially unidirectional interaction between portions of the pump signal and input signals having the first polarization and at least substantially unidirectional interaction between portions of the pump signal and input signals having the second polarization.

22. The multiple wavelength converter of claim 14, wherein the conversion efficiency comprises at least 4.7 decibels and wherein the cross-talk comprises less than minus twenty-seven decibels (−27 dB) over a wavelength range of at least thirty (30) nanometers.

23. A multiple wavelength converter, comprising:
a polarization beam splitter operable to receive a plurality of input optical signals and to communicate a first portion of each of the plurality of input optical signals comprising a first polarization in one direction, and to communicate a second portion of each of the plurality of input optical signals comprising a second polarization in a second direction;
an optical medium operable to propagate a first pump signal comprising approximately the first polarization and the first portions of the input signals in a first direction, and to propagate a second pump signal comprising approximately the second polarization and the second portions of the input signals in a second direction;
wherein the optical medium facilitates at least substantially unidirectional interaction between the first portions of the input signals and the first pump signal and between the second portions of the input signals and the second pump signal to generate first portions and second portions of a plurality of converted wavelength signals; and
wherein the polarization beam splitter is operable to receive and combine the first and second portions of the plurality of converted wavelength signals to form a plurality of converted wavelength signals.

24. The multiple wavelength converter of claim 23, wherein the plurality of input signals comprise signals in a first band of wavelengths and wherein the plurality of converted wavelength signals comprise signals in a second band of wavelengths.

25. The multiple wavelength converter of claim 23, wherein a wavelength of the pump signal resides spectrally between wavelengths of at least some of the plurality of input signals and wavelengths of at least some of the plurality of converted wavelength signals.

26. The multiple wavelength converter of claim 23, wherein the optical medium comprises a medium operable to facilitate a Chi-3 or effective Chi-3 nonlinear effect resulting in generation of the converted wavelength signals comprising instances of the optical input signals reflected about a wavelength of the pump signal.

27. The multiple wavelength converter of claim 26, wherein the Chi-3 or effective Chi-3 nonlinear effect comprises parametric amplification, modulation instability, or four wave mixing.

28. The multiple wavelength converter of claim 23, wherein the optical medium comprises a propagation length selected to result in a cross talk of less than minus fourteen (−14) decibels over a wavelength range of at least seven (7) nanometers.

29. The multiple wavelength converter of claim 23, wherein the optical medium comprises a propagation length selected to result in a cross talk of less than minus twenty-seven (−27) decibels over a wavelength range of at least thirty (30) nanometers.

30. The multiple wavelength converter of claim 23, wherein the optical medium comprises a polarization maintaining fiber.

31. The multiple wavelength converter of claim 23, further comprising a polarization controller coupled to the optical medium and operable to facilitate directing at least substantially all of the converted wavelength signals from a single output port of the polarization beam splitter.

32. The multiple wavelength converter of claim 31, wherein the single output port comprises the input port that receives the plurality of input optical signals, and further comprising a circulator operable to direct the converted wavelength signals from the path of the input optical signals.

33. The multiple wavelength converter of claim 23, wherein the first pump signal and the second pump signal comprise approximately orthogonally polarized portions separated from a pump signal generated by a single pump source.

34. The multiple wavelength converter of claim 23, wherein the first pump signal and the second pump signal comprise pump signals generated at separate pump sources.

35. The multiple wavelength converter of claim 23, further comprising a first optical coupler and a second optical coupler each residing between the polarization beam splitter and an end of the optical medium, wherein each optical coupler is operable to introduce one of the pump signals to the optical medium.

36. The multiple wavelength converter of claim 23, wherein a polarization sensitivity of the converter comprises less than 1.2 decibels over a wavelength range of at least 7 nanometers.

37. The multiple wavelength converter of claim 23, wherein a polarization sensitivity of the converter comprises 0.6 decibels or less over a wavelength range of at least 35 nanometers.

38. A multiple wavelength converter, comprising:

an optical gain medium comprising:

a first operable to receive from a polarization beam splitter first portions of a plurality of input optical signals and a first pump signal, each of the first portions and the first pump signal comprising at least substantially a first polarization; and a second operable to receive second portions of the plurality of input optical signals and a second pump signal, the second portions and the second pump signal comprising at least substantially a second polarization approximately orthogonal to the first polarization;

wherein the optical gain medium is operable to facilitate at least substantially unidirectional interaction between the first portions and the first pump signal to generate first portions of a plurality of converted wavelength signals, and to facilitate at least substantially unidirectional interaction between the second portions and the second pump signals to generate second portions of the plurality of converted wavelength signals, wherein the first and second portions of the plurality of converted wavelength signals are operable to be combined by the polarization beam splitter to form a plurality of converted wavelength signals.

39. The multiple wavelength converter of claim 38, wherein the plurality of input signals comprise signals in a first band of wavelengths and wherein the plurality of converted wavelength signals comprise signals in a second band of wavelengths.

40. The multiple wavelength converter of claim 38, wherein the optical medium comprises a medium operable to facilitate a Chi-3 or effective Chi-3 nonlinear effect resulting in generation of the converted wavelength signals comprising instances of the optical input signals reflected about a wavelength of the pump signal.

41. The multiple wavelength converter of claim 38, wherein the optical medium comprises a propagation length selected to result in a cross talk of less than minus fourteen (−14) decibels over a wavelength range of at least seven (7) nanometers.

42. The multiple wavelength converter of claim 38, wherein the optical medium comprises a propagation length selected to result in a cross talk of less than minus twenty-seven (−27) decibels over a wavelength range of at least thirty nanometers.

43. The multiple wavelength converter of claim 38, wherein the optical medium comprises a polarization maintaining fiber.

44. The multiple wavelength converter of claim 38, further comprising a polarization controller coupled to the optical medium and operable to facilitate directing at least substantially all of the converted wavelength signals from a single output port of the polarization beam splitter.

45. The multiple wavelength converter of claim 44, wherein the single output port comprises the input port that receives the plurality of input optical signals, and further comprising a circulator operable to direct the converted wavelength signals from the path of the input optical signals.

46. The multiple wavelength converter of claim 38, wherein the first pump signal and the second pump signal comprise approximately orthogonally polarized portions separated from a pump signal generated by a single pump source.

47. The multiple wavelength converter of claim 38, further comprising a first optical coupler and a second optical coupler each residing between the polarization beam splitter and an end of the optical medium, wherein each optical coupler is operable to introduce one of the pump signals to the optical medium.

48. The multiple wavelength converter of claim 38, wherein a polarization sensitivity of the converter comprises less than 1.2 decibels over a wavelength range of at least 7 nanometers.

49. The multiple wavelength converter of claim 38, wherein a polarization sensitivity of the converter comprises 0.6 decibels or less over a wavelength range of at least 35 nanometers.

50. The multiple wavelength converter of claim 38, wherein the polarization beam splitter comprises:

a first port operable to receive the pump signal and a plurality of input optical signals;

a second port operable to communicate toward the first end of the optical medium the first portions of the pump signal and the plurality of input optical signals, and to receive from the second end of the optical medium the second portions of the plurality of converted wavelength optical signals;

a third port operable to communicate toward the second end of the optical medium the second portions of the pump signal and the plurality of input optical signals, and to receive from the first end of the optical medium the first portions of the plurality of converted wavelength optical signals; and a fourth port operable to communicate the plurality of converted wavelength optical signals.

51. A system operable to generate a plurality of optical signals each having at least one distinct wavelength, the system comprising:

a plurality of optical transmitters each operable to generate one of a plurality of optical input signals each comprising a wavelength in a first subset of wavelengths; and a multiple wavelength converter coupled to the plurality of optical transmitters and operable to approximately simultaneously generate, for each of the plurality of optical input signals, a converted wavelength signal comprising a wavelength in a second subset of wavelengths;

wherein a cross-talk between the converted wavelength signals comprises less than minus fourteen decibels (−14 dB) over a wavelength range of at least seven (7) nanometers or wherein a polarization sensitivity of the converter is less than 1.2 decibels over a wavelength range of at least seven (7) nanometers.

52. The system of claim 51, wherein the first subset of wavelengths resides within a first communications band and wherein the second subset of wavelengths resides within a second communications band.

53. The system of claim 52, wherein the first communications band comprises the conventional band (C-band) of wavelengths and wherein the second communications band comprises either the short band (S-band) or the long band (L-band) of wavelengths.

54. The system of claim 51, wherein the multiple wavelength converter comprises an optical medium operable to receive a pump signal and the plurality of input signals, wherein the pump signal and each of the plurality of input signals are synchronized to overlap at least partially during at least a part of the time spent traversing the optical medium to facilitate generation of the plurality of converted wavelength signals.

55. The system of claim 54, wherein the optical medium comprises a medium operable to facilitate a Chi-3 or effective Chi-3 nonlinear effect resulting in generation of the converted wavelength signals comprising instances of the optical input signals reflected about a wavelength of the pump signal.

56. The system of claim 54, wherein the optical medium comprises a propagation length selected to result in a cross talk of minus twenty-seven (−27) decibels or less in the converted wavelength signals over a wavelength range of at least seven (7) nanometers.

57. The system of claim 51, wherein the multiple wavelength converter comprises an optical gain medium comprising:
- a first end operable to receive from a polarization beam splitter first portion of a plurality of input optical signals and a first pump signal, each of the portions and the first pump signals comprising at least a first polarization; and
- a second end operable to receive second portions of the plurality of input optical signals and a second pump signal, the second portions and the second pump signal comprising at lest substantially a second polarization approximately orthogonal to tho first polarization;
- wherein the optical gain medium is to facilitate at least substantially unidirectional interaction between the first portions and the first pump signal and between the second portions and the second pump signal to facilitate generation of the plurality of converted wavelength signals.

58. The system of claim 57, wherein the optical medium comprises a polarization maintaining fiber.

59. The system of claim 57, further comprising a polarization controller coupled to the optical medium and operable to facilitate directing at least substantially all of the converted wavelength signals from a single output port of the polarization beam splitter.

60. The system of claim 59, wherein the single output port comprises the input port that receives the plurality of input optical signals, and further comprising a circulator operable to direct the converted wavelength signals from the path of the input optical signals.

61. The system of claim 51, wherein a polarization sensitivity of the converter comprises 0.6 decibels or less over a wavelength range of at least 35 nanometers.

62. A system operable to convert a plurality of wavelengths, the system comprising:
- one or more optical transmitters operable to generate alone or in combination a plurality of optical input signals each comprising wavelength in a first communications band; and
- a multiple wavelength converter coupled to the one or more optical transmitters and operable to generate, for each of the plurality of optical input signals, a converted wavelength signals comprising a wavelength in a second communications band;
- wherein the multiple wavelength converted comprises an optical fiber having a propagation length and a zero dispersion wavelength, the optical fiber operable to receive a pump signal having a pump wavelength, the propagation length and a spectral relationship between the zero dispersion wavelength and the pump wavelength at least partially determining the amplitudes of the plurality of converted wavelength signals.

63. The system of claim 62, wherein the first communications band comprises the conventional band (C-band) of wavelengths and wherein the second communications band comprises either the short band (S-band) or the long band (L-band) of wavelengths.

64. The system of claim 62, wherein a cross-talk between the converted wavelength signals comprises less than minus fourteen decibels (−14 dB) over a wavelength range of at least seven (7) nanometers or wherein a polarization sensitivity of the converter is less than 1.2 decibels over a wavelength range of at least seven (7) nanometers.

65. The system of claim 62, wherein the multiple wavelength converter comprises an optical medium operable to receive a pump signal and the plurality of input signals, wherein the pump signal and each of the plurality of input signals are synchronized to overlap at least partially during at least a part of the time spent traversing the optical medium to facilitate generation of the plurality of converted wavelength signals.

66. The system of claim 62, wherein the multiple wavelength converter comprises an optical gain medium comprising:
- a first end operable to receive from a polarization beam splitter first portions of a plurality of input signals and a first pump signal, each of the first portions and the first pump signal comprising at least substantially a first polarization; and
- a second end operable to receive seconds portions of the plurality of input optical signals and a seconds pump signal, the second portions and the second pump signal comprising at least substantially a second polarization approximately orthogonal to the first polarization;
- wherein the optical gain medium is operable to facilitate at least substantially unidirectional interaction between the first portions and the first pump signal and between the second portions and the second pump to facilitate generation of the plurality of converted wavelength signals.

67. The system of claim 66, wherein the optical medium comprises a propagation length selected to result in a cross talk of minus twenty-seven (−27) decibels or less in the converted wavelength signals over a wavelength range of at least seven (7) nanometers.

68. The system of claim 62, wherein a polarization sensitivity of the converter comprises 0.6 decibels or less over a wavelength range of at least 35 nanometers.

69. The system of claim 62, wherein the optical fiber is operable to facilitate a Chi-3 or effective Chi-3 nonlinear effect resulting in generation of the converted wavelength signals comprising instances of the optical signals reflected about a wavelength of a pump signal.

70. The system of claim 69, wherein the pump wavelength is greater than the zero-dispersion wavelength and wherein the Chi-3 nonlinear effect comprises parametric amplifications or modulation instability.

71. The system of claim 62, wherein the propagation length is at least 300 meters.

72. The system of claim 62, wherein the pump wavelength is close to the zero-dispersion wavelength.

73. The system of claim 62, wherein the pump wavelength is within 2 nanometers of the zero-dispersion wavelength.

74. The system of claim 62, wherein the pump wavelength is greater than the zero-dispersion wavelength.

75. A system operable to convert a plurality of wavelengths to facilitate protection switching, the system comprising:
- an optical medium operable to communicate optical signals comprising wavelengths residing in a first set of wavelengths or a second set of wavelengths;

a multiple wavelength converter coupled to the optical medium, the multiple wavelength converter operable to receive a plurality of optical signals each comprising a wavelength in the first set of wavelengths and to approximately simultaneously generate, for each of the plurality of optical signals, a converted wavelength signal comprising a wavelength in the second set of wavelengths;

wherein the second set of wavelengths comprises a protection path for the first set of wavelengths operable to be utilized in the event of detection of a fault associated with a communication path carrying optical signals comprising wavelengths from the first set of wavelengths or a fault associated with the optical signals.

76. The system of claim 75, wherein the optical medium comprises:
   a first optical medium operable to communicate signals comprising wavelengths in the first set of wavelengths; and
   a second optical medium operable to communicate signals comprising wavelengths in the second set of wavelengths.

77. The system of claim 76, wherein the first and second optical media comprise physically distinct media from one another.

78. The system of claim 75, wherein the first set of wavelengths resides in the conventional communications band and wherein the second set of wavelengths resides in either the short communications band (S-band) or the long communications band (L-band) of wavelengths.

79. The system of claim 75, wherein the wavelength converter is operable to generate the converted wavelength signals in response to a fault detected.

80. The system of claim 75, wherein a cross-talk between the converted wavelength signals comprises less than minus fourteen decibels (−14 dB) over a wavelength range of at least seven (7) nanometers or wherein a polarization sensitivity of the converter is less than 1.2 decibels over a wavelength range of at least seven (7) nanometers.

81. The system of claim 75, wherein the multiple wavelength converter comprises an optical medium operable to receive a pump signal and the plurality of input signals, wherein the pump signal and each of the plurality of input signals are synchronized to overlap at least partially during at least a part of the time spent traversing the optical medium to facilitate generation of the plurality of converted wavelength signals.

82. The system of claim 75, wherein the multiple wavelength converter comprises an optical gain medium comprising:
   a first end operable to receive from a polarization beam splitter first portions of a plurality of input optical signals and a first pump signal, of the first portions and the first pump signal comprising at least substantially a first polarization; and
   a second end operable to receive second portions of the plurality of input optical signals and a second pump signal, the second portions and the second pump signal comprising at least substantially a second polarization approximately orthogonal to the first polarization;
   wherein the optical gain medium is operable to facilitate at least substantially unidirectional interaction between the first portions and the first pump signal and between the second portions and tho second pump signal to facilitate generation of the plurality of converted wavelength signals.

83. The system of claim 75, wherein the optical medium comprises a propagation length selected to result in a cross talk of minus twenty-seven (−27) decibels or less in the converted wavelength signals over a wavelength range of at least seven (7) nanometers.

84. The system of claim 75, wherein a polarization sensitivity of the converter comprises 0.6 decibels or less over a wavelength range of at least 35 nanometers.

85. A method of generating a plurality of converted wavelength signals, comprising:
   receiving a plurality of optical input signals each comprising at least one distinct wavelength;
   receiving a pump signal comprising a pump wavelength that is either shorter or longer than each of the wavelengths of the plurality of input optical signals;
   copropagating the plurality of input optical signals and the pump signal over a nonlinear optical medium;
   generating a plurality of converted wavelength signals based on an interaction between the plurality of input optical signals and the pump signal;
   wherein a cross-talk between the converted wavelength signals comprises less than minus fourteen decibels (−14 dB) over a wavelength range of at least seven (7) nanometers or wherein a polarization sensitivity associated with the converted wavelength signals is less than 1.2 decibels over a wavelength range of at least seven (7) nanometers.

86. The method of claim 85, wherein the plurality of input signals comprise signals in a first band of wavelengths and wherein the plurality of converted wavelength signals comprise signals in a second band of wavelengths.

87. The method of claim 86, wherein the first band comprises the conventional band (C-band) of wavelengths and wherein the second band comprises either the short band (S-band) or the long band (L-band) of wavelengths.

88. The method of claim 85, wherein the optical medium comprises a medium operable to facilitate a Chi-3 or effective Chi-3 nonlinear effect.

89. The method of claim 88, wherein the Chi-3 or effective Chi-3 nonlinear effect comprises parametric amplification, modulation instability or four wave mixing.

90. The method of claim 88, wherein a polarization sensitivity associated with the converted wavelengths comprises less than 0.6 decibels or less over a wavelength range of at least 35 nanometers.

91. The method of claim 85, wherein the optical medium comprises a propagation length selected to result in a conversion efficiency of at least 4.7 decibels and a cross talk of −27 decibels or less in the converted wavelength signals over a wavelength range of at least 30 nanometers.

92. The method of claim 85, wherein receiving a plurality of optical input signals comprises:
   receiving the plurality: of optical input signals at a polarization beam splitter; and
   separating each of the plurality of optical input signals into a first portion comprising a first polarization and a second portion comprising a second polarization.

93. The method of claim 92, wherein receiving a pump signal comprises:
   receiving the pump signal at a polarization beam splitter; and
   separating the pump signal into a first pump signal comprising a first polarization and a second pump signal comprising a second polarization.

94. The method of claim 93, wherein copropagating the plurality of input optical signals and the pump signal over a nonlinear optical medium comprises:

propagating the first portions and the first pump signal in one direction through the optical medium; and propagating the second portions and the second pump signal in a second direction opposite the first direction through the optical medium.

95. The method of claim 85, wherein a polarization sensitivity associated with the converted wavelengths comprises 0.6 decibels or less over a wavelength range of at least 35 nanometers.

96. A method of generating a plurality of converted wavelength signals, comprising:

receiving a plurality of optical input signals each comprising at least one distinct wavelength;

receiving a pump signal comprising a pump wavelength that is either shorter or longer than each of the wavelengths of the plurality of input optical signals;

copropagating the plurality of input optical signals and the pump signal over a nonlinear optical medium, the nonlinear medium comprising a propagation length;

generating a plurality of converted wavelength signals based on an interaction between the plurality of input optical signals and the pump signal;

wherein the propagation length of the optical medium is selected to result in a conversion efficiency of at least minus sixteen (−16) decibels and a cross talk of minus fourteen (−14) decibels or less in the converted wavelength signals over a wavelength range of at least seven (7) nanometers.

97. The method of claim 96, wherein the plurality of input signals comprise signals in a first band of wavelengths and wherein the plurality of converted wavelength signals comprise signals in a second band of wavelengths.

98. The method of claim 96, wherein receiving a plurality of optical input signals comprises:

receiving the plurality of optical input signals at a polarization beam splitter; and separating each of the plurality of optical input signals into a first portion comprising a first polarization and a second portion comprising a second polarization.

99. The method of claim 98, wherein receiving a pump signal comprises:

receiving the pump signal at a polarization beam splitter; and separating the pump signal into a first pump signal comprising a first polarization and a second pump signal comprising a second polarization.

100. The method of claim 99, wherein copropagating the plurality of input optical signals and the pump signal over a nonlinear optical medium comprises:

propagating the first portions and the first pump signal in one direction through the optical medium; and propagating the second portions and the second pump signal in a second direction opposite the first direction through the optical medium.

101. The method of claim 96, wherein the optical medium comprises a propagation length selected to result in a conversion efficiency of at least 4.7 decibels and a cross talk of −27 decibels or less in the converted wavelength signals over a wavelength range of at least 30 nanometers.

102. The method of claim 96, wherein a polarization sensitivity associated with the converted wavelengths comprises 0.6 decibels or less over a wavelength range of at least 35 nanometers.

103. A method of generating a plurality of converted wavelength signals, comprising:

receiving at a polarization beam splitter a plurality of optical input signals each comprising at least one distinct wavelength;

separating each of the plurality of optical input signals into a first portion comprising a first polarization and a second portion comprising a second polarization;

copropagating the first portions and a first pump signal in a first direction along a nonlinear optical medium, wherein an interaction between the first pump signal and the first portions results in generation of first portions of converters wavelength signals;

copropagating the second portions and a second pump signal in a second direction opposite the first direction along the nonlinear optical medium, wherein an interaction between the second pump signal and the second portions results in generation of second portions of converted wavelength signals; and combining the first and second portions of the converted wavelength at signals the polarization beam splitter to form a plurality of converted wavelength signals.

104. The method of claim 103, wherein the plurality of input signals comprise signals in a first band of wavelengths and wherein the plurality of converted wavelength signals comprise signals in a second band of wavelengths.

105. The method of claim 103, wherein the optical medium comprises a propagation length selected to result in a conversion efficiency of at least minus sixteen (−16) decibels and a cross talk of minus fourteen (−14) decibels or less in the converted wavelength signals over a wavelength range of at least seven (7) nanometers.

106. The method of claim 103, wherein the optical medium comprises a polarization maintaining fiber.

107. The method of claim 103, wherein copropagating the first portions and the first pump signal and copropagating the second portions and the second pump signal comprises controlling the polarization of the first and second portions and the first and second pump signals to direct at least substantially all of the converted wavelength signals from a single output port of the polarization beam splitter.

108. The method of claim 107, wherein the single output port comprises the input port that receives the plurality of input optical signals, and further comprising redirection the converted wavelength signals leaving the output port from the path of the input optical signals.

109. The method of claim 103, wherein copropagating the first portions and the first pump signal and copropagating the second portions and the second pump signal comprises introducing the first and second pump signals to the optical medium without passing the first and second pump signals through the polarization beam splitter.

110. The method of claim 103, wherein the first pump signal and the second pump signal comprise approximately orthogonally polarized portions separated from a pump signal generated by a single pump source.

111. The method of claim 103, wherein the first pump signal and the second pump signal comprise pump signals generated at separate pump sources.

112. The method of claim 103, wherein a polarization sensitivity associated with the converted wavelengths comprises less than 1.2 decibels or less over a wavelength range of at least 7 nanometers.

113. The method of claim 103, wherein a polarization sensitivity associated with the converted wavelengths comprises 0.6 decibels or less over a wavelength range of at least 35 nanometers.

114. A method of generating a plurality of converted wavelength signals, comprising:

receiving a plurality of optical input signals each comprising at least one distinct wavelength residing in a first communications band;

receiving a pump signal comprising a pump wavelength that is either shorter or longer than each of the wavelengths of the plurality of input optical signals;

copropagating the plurality of input optical signals and the pump signal over a nonlinear optical medium, the linear optical medium comprising an optical fiber having a propagating length and a zero dispersion wavelength associated with the optical fiber; and generating a plurality of converted wavelength signals based on an interaction between the plurality of input optical signals and the pump signal, wherein tho plurality of converted wavelength signals reside in a second communications band, wherein the propagation length and a spectral relationship between the zero dispersion wavelength and the pump wavelength at least partially determines the amplitudes of the plurality of converted wavelength signals.

115. The method of claim 114, wherein a cross-talk between the converted wavelength signals comprises less than minus fourteen decibels (−14 dB) over a wavelength range of at least seven (7) nanometers or wherein a polarization sensitivity associated with the converted wavelength signals is less than 1.2 decibels over a wavelength range of at least seven (7) nanometers.

116. The method of claim 114, wherein the first band comprises the conventional band (C-band) of wavelengths and wherein the second band comprises either the short band (S-band) or the long band (L-band) of wavelengths.

117. The method of claim 114, wherein receiving a plurality of optical input signals comprises:

receiving the plurality of optical input signals at a polarization beam splitter; and separating each of the plurality of optical input signals into a first portion comprising a first polarization and a second portion comprising a second polarization.

118. The method of claim 117, wherein receiving a pump signal comprises:

receiving the pump signal at a polarization beam splitter; and separating the pump signal into a first pump signal comprising a first polarization and a second pump signal comprising a second polarization.

119. The method of claim 118, wherein copropagating the plurality of input optical signals and the pump signal over a nonlinear optical medium comprises:

propagating the first portions and the first pump signal in one direction through the optical medium; and propagating the second portions and the second pump signal in a second direction opposite the first direction through the optical medium.

120. The method of claim 114, wherein the optical medium comprises a propagation length selected to result in a conversion efficiency associated with the converted wavelength signals of at least 4.7 decibels and a cross-talk associated with the converted wavelength signals of −27 decibels or less over a wavelength range of at least thirty 30 nanometers.

121. The method of claim 114, wherein the optical fiber is operable to facilitate a Chi-3 or effective Chi-3 nonlinear effect resulting in generation of the converted wavelength signals comprising instances of the optical input signals reflected about a wavelength of a pump signal.

122. The method of claim 121, wherein the pump wavelength is greater than the zero-dispersion wavelength and the wherein the Chi-3 nonlinear effect comprises parametric amplification or modulation intensity.

123. The method of claim 114, wherein the propagation length is at least 300 meters.

124. The method of claim 114, wherein the pump wavelength is close to the zero-dispersion wavelengths.

125. The method of claim 114, wherein the pump wavelength is within 2 nanometers of the zero-dispersion wavelength.

126. The method of claim 114, wherein the pump wavelength is greater than the zero-dispersion wavelength.

127. A method of protection switching, comprising:

receiving a plurality of optical input signals each comprising at least one distinct wavelength residing in a first set of wavelengths associated with a first communication path;

receiving a pump signal comprising a pump wavelength that is either shorter or longer than each of the wavelengths of the plurality of input optical signals;

detecting a fault associated with the first communication path;

copropagating the plurality of input optical signals and the pump signal over a nonlinear optical medium;

generating a plurality of converted wavelength signals based on an interaction between the plurality of input optical signals and the pump signal, wherein the plurality of converted wavelength signals reside in a second set of wavelengths associated with a second communication path; and in response to detecting the fault, communicating the plurality of converted wavelength signals over the second path.

128. The method of claim 127, wherein a cross-talk between the converted wavelength signals comprises less than minus fourteen decibels (−14 dB) over a wavelength range of at least seven (7) nanometers or wherein a polarization sensitivity associated with the converted wavelength signals is less than 1.2 decibels over a wavelength range of at least seven (7) nanometers.

129. The method of claim 127, wherein the first set comprises the conventional band (C-band) of wavelengths and wherein the second set comprises either the short band (S-band) or the long band (L-band) of wavelengths.

130. The method of claim 127, wherein receiving a plurality of optical input signals comprises:

receiving the plurality of optical input signals at a polarization beam splitter; and separating each of the plurality of optical input signals into a first portion comprising a first polarization and a second portion comprising a second polarization.

131. The method of claim 130, wherein receiving a pump signal comprises:

receiving the pump signal at a polarization beam splitter; and separating the pump signal into a first pump signal comprising a first polarization and a second pump signal comprising a second polarization.

132. The method of claim 131, wherein copropagating the plurality of input optical signals and the pump signal over a nonlinear optical medium comprises:

propagating the first portions and the first pump signal in one direction through the optical medium; and propagating the second portions and the second pump signal in a second direction opposite the first direction through the optical medium.

133. The method of claim 127, wherein the optical medium comprises a propagation length selected to result in a conversion efficiency associated with the converted wavelength signals of at least 4.7 decibels and a cross-talk associated with the converted wavelength signals of minus twenty-seven (−27) decibels or less over a wavelength range of at least thirty (30) nanometers.

134. The method of claim 127, wherein a polarization sensitivity associated with the converted wavelengths comprises less than 0.6 decibels or less over a wavelength range of at least 35 nanometers.

135. The method of claim 127, wherein generating the plurality of converted wavelength signals comprises generating the plurality of converted wavelength signals after a fault has been detected.

* * * * *